April 10, 1956 G. E. TENCH ET AL 2,741,214
PAN GREASER
Filed Nov. 3, 1952 10 Sheets-Sheet 1
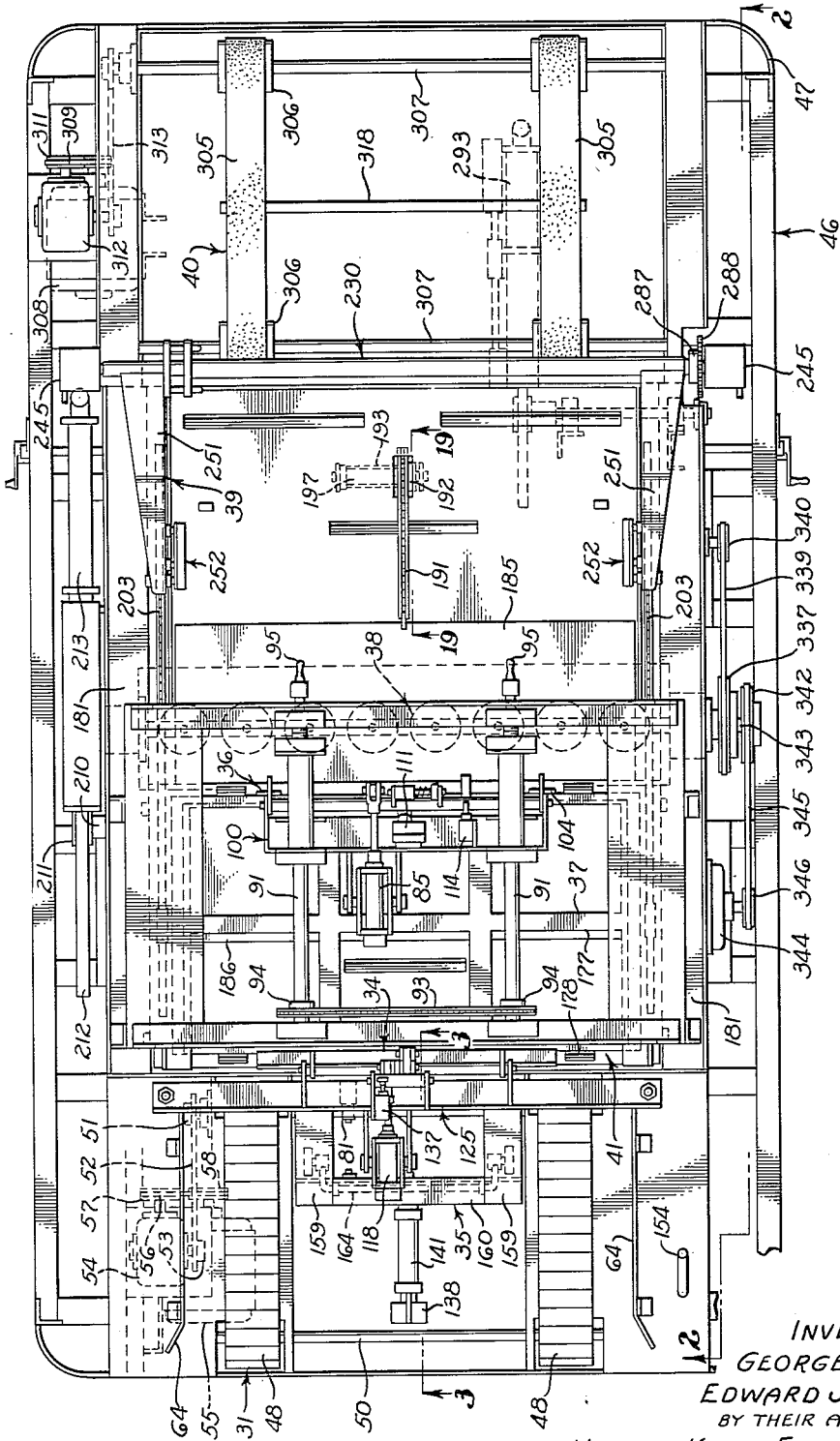
Fig.1.
INVENTORS.
GEORGE E. TENCH
EDWARD J. WILLIAMS
BY THEIR ATTORNEYS.
HARRIS, KIECH, FOSTER & HARRIS
BY

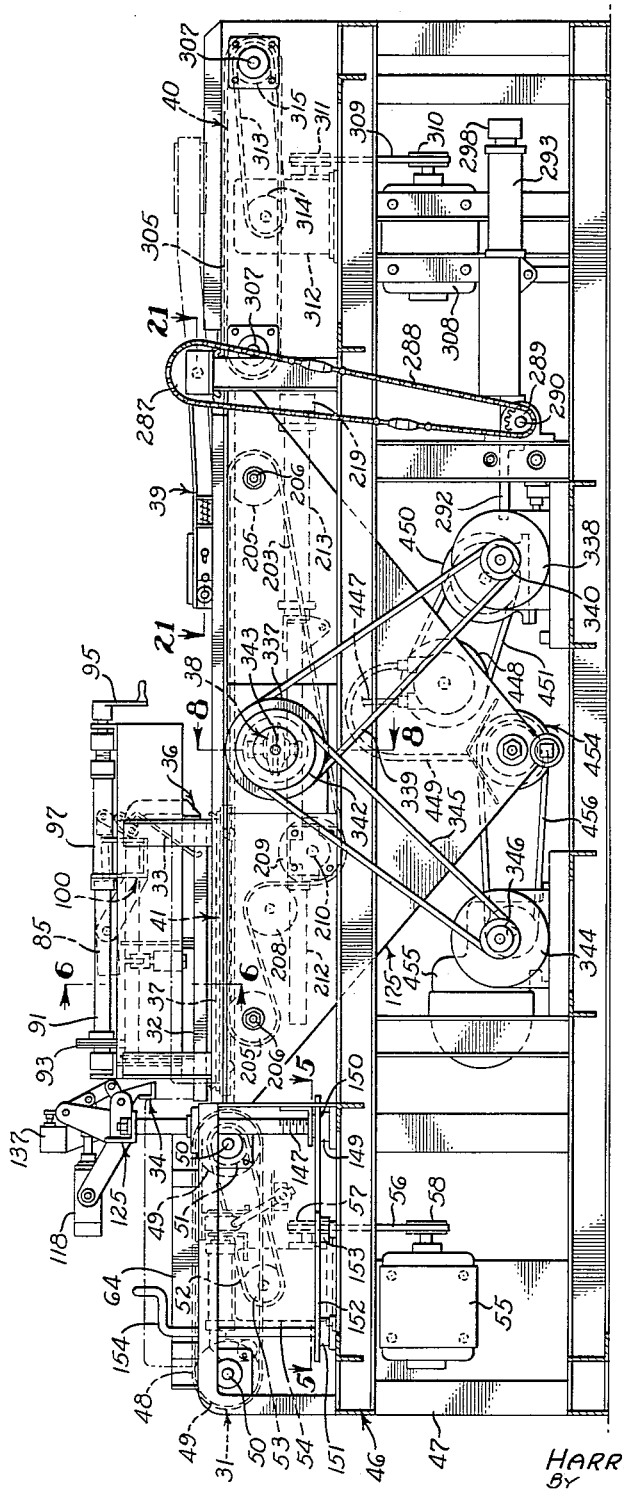

April 10, 1956 G. E. TENCH ET AL 2,741,214
PAN GREASER
Filed Nov. 3, 1952 10 Sheets-Sheet 3
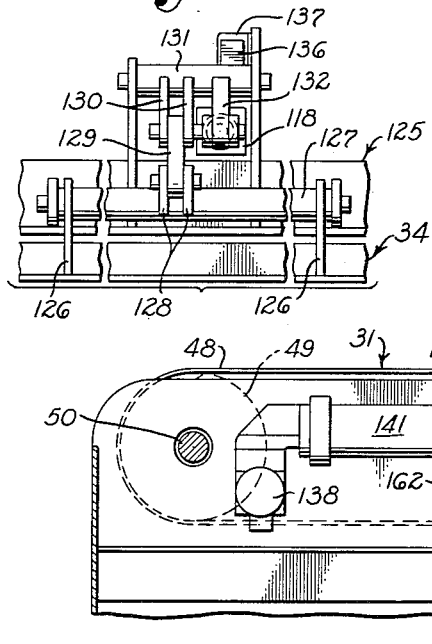
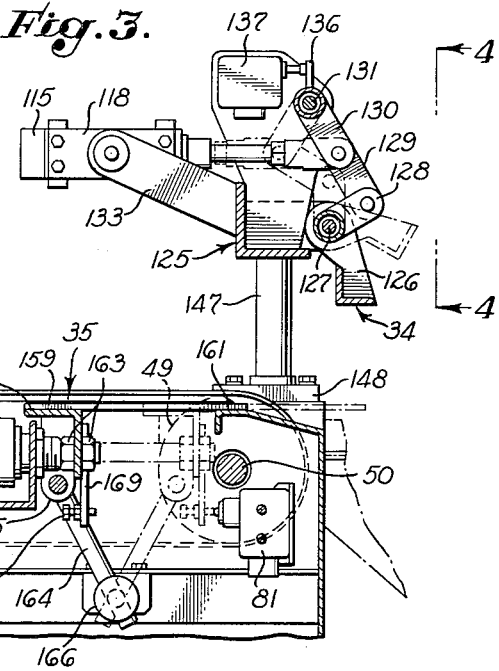
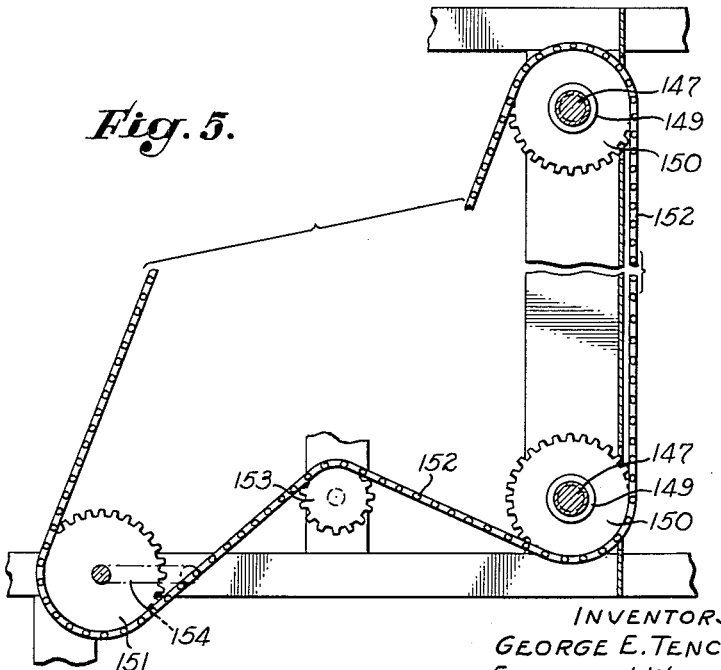
INVENTORS.
GEORGE E. TENCH
EDWARD J. WILLIAMS
BY THEIR ATTORNEYS.
HARRIS, KIECH, FOSTER & HARRIS

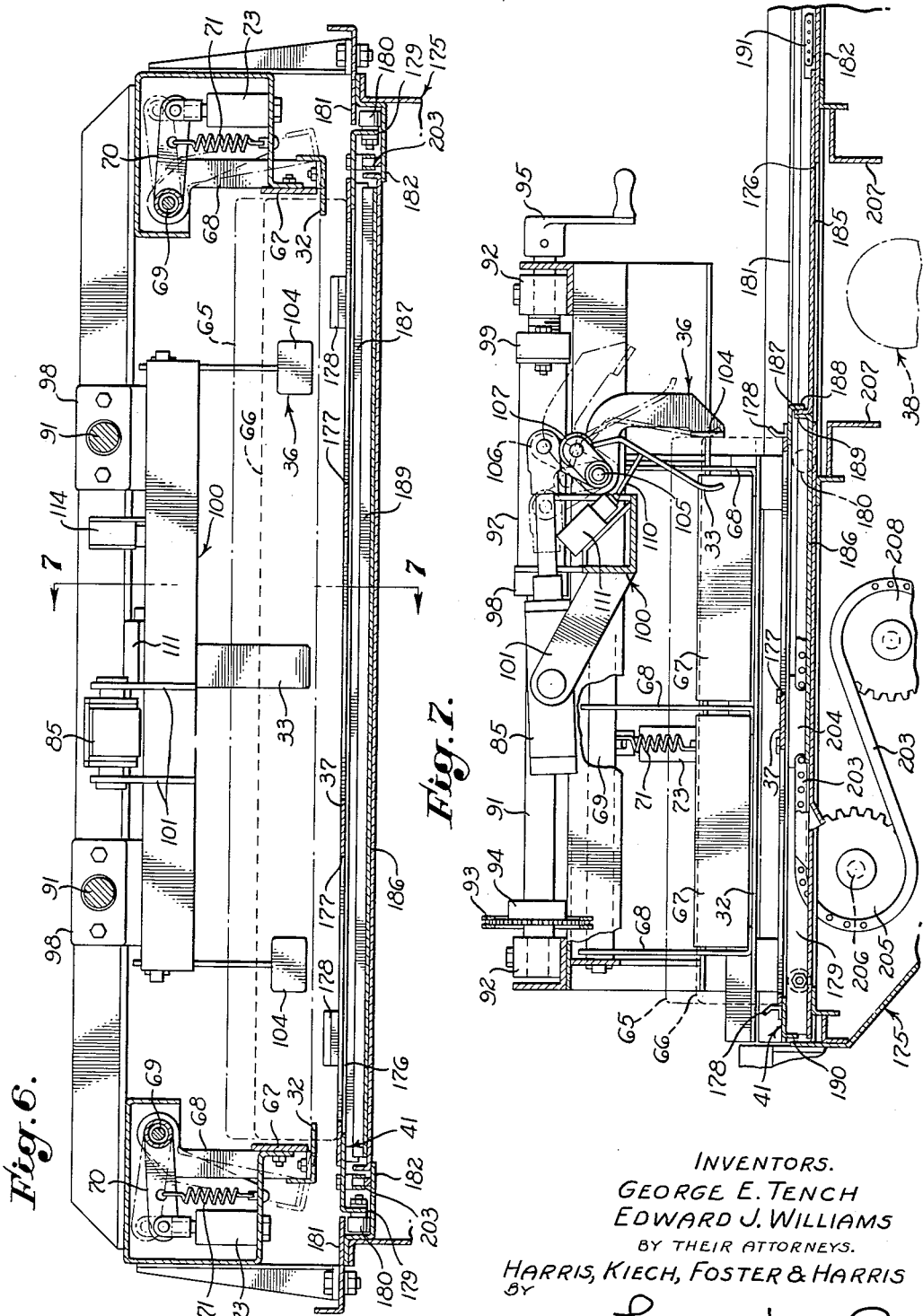

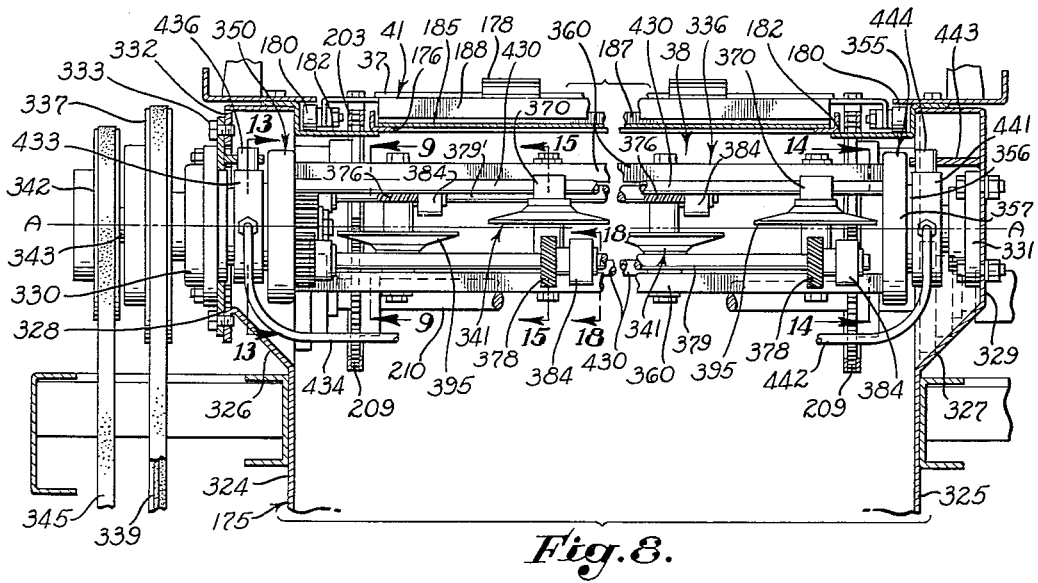
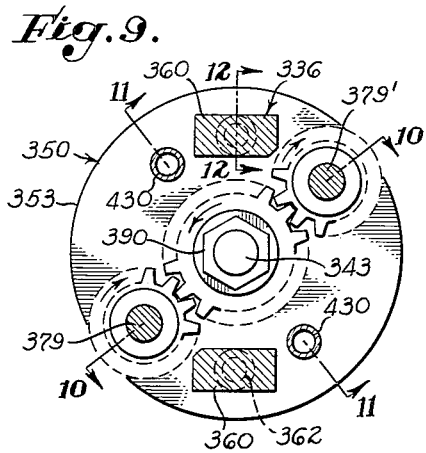
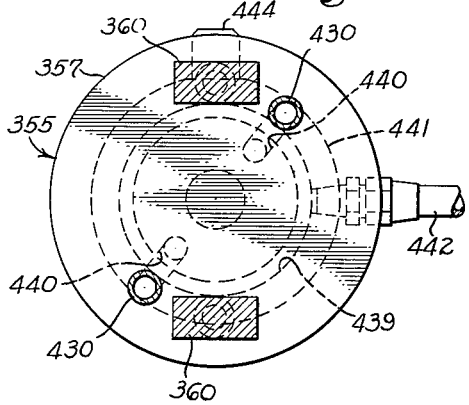
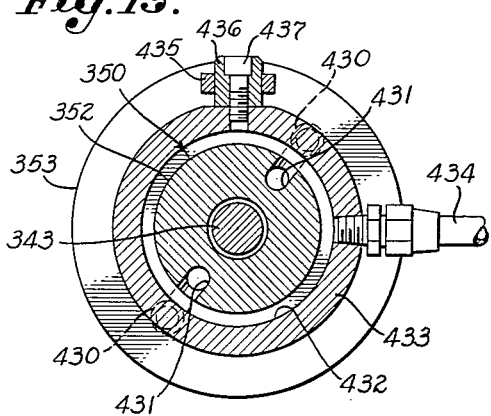

INVENTORS.
GEORGE E. TENCH
EDWARD J. WILLIAMS
BY THEIR ATTORNEYS.
HARRIS, KIECH, FOSTER & HARRIS
BY

April 10, 1956
G. E. TENCH ET AL
2,741,214
PAN GREASER
Filed Nov. 3, 1952
10 Sheets-Sheet 7
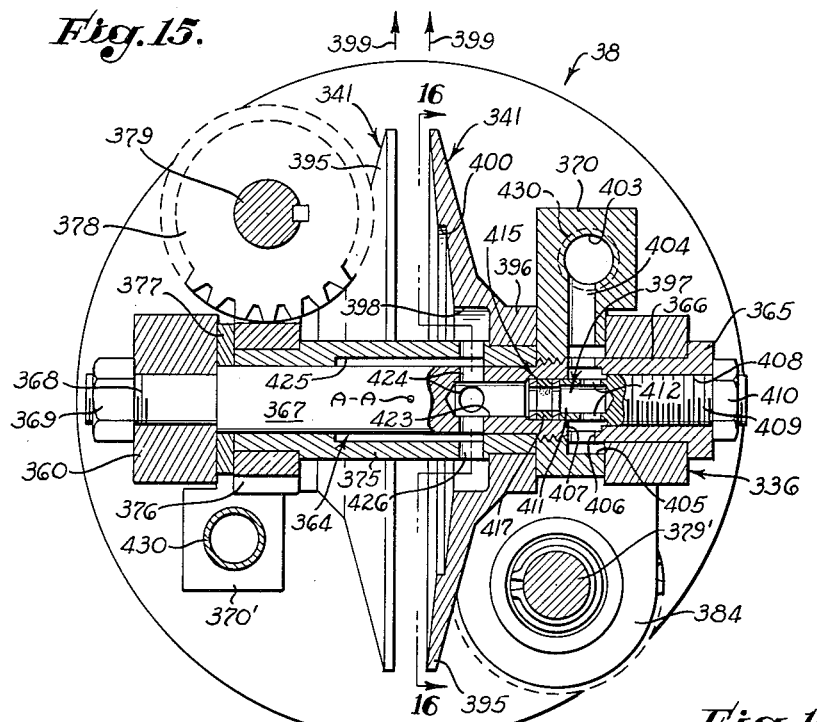
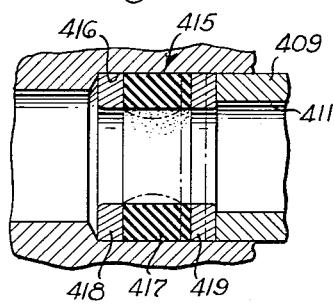
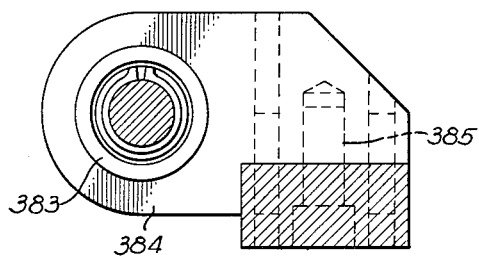
INVENTORS.
GEORGE E. TENCH
EDWARD J. WILLIAMS
BY THEIR ATTORNEYS.
HARRIS, KIECH, FOSTER & HARRIS April 10, 1956 G. E. TENCH ET AL 2,741,214
PAN GREASER
Filed Nov. 3, 1952 10 Sheets-Sheet 8
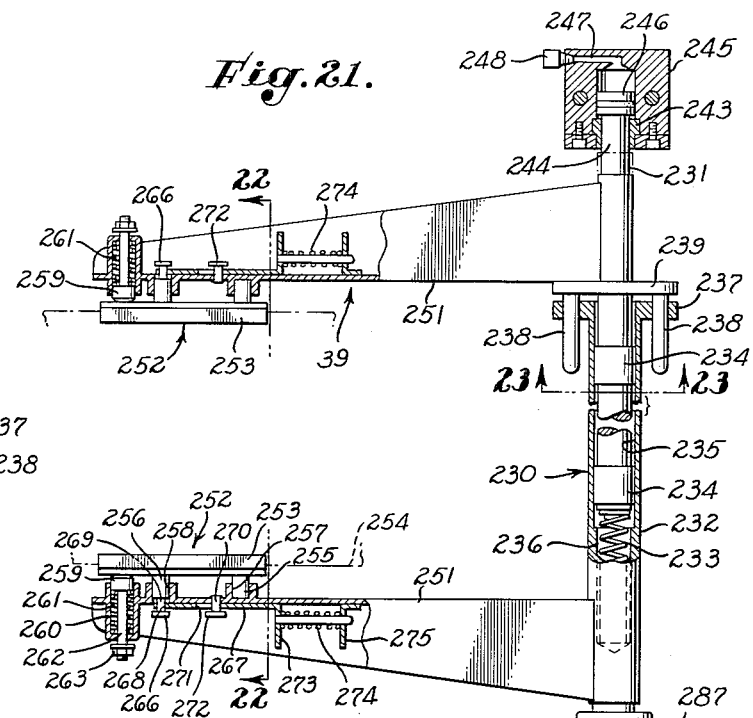
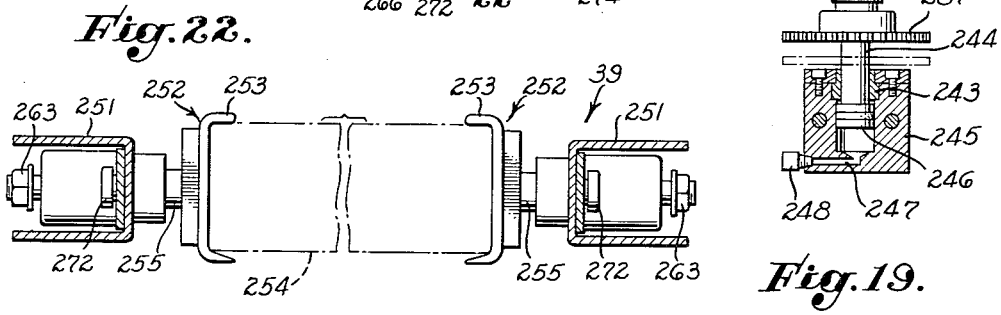
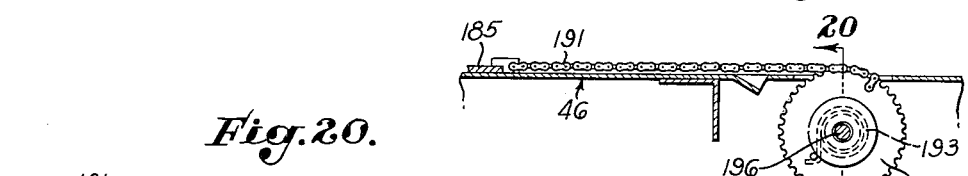
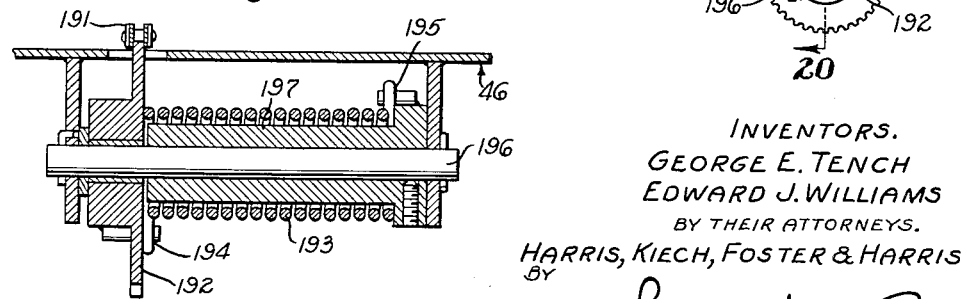
INVENTORS.
GEORGE E. TENCH
EDWARD J. WILLIAMS
BY THEIR ATTORNEYS.
HARRIS, KIECH, FOSTER & HARRIS
BY

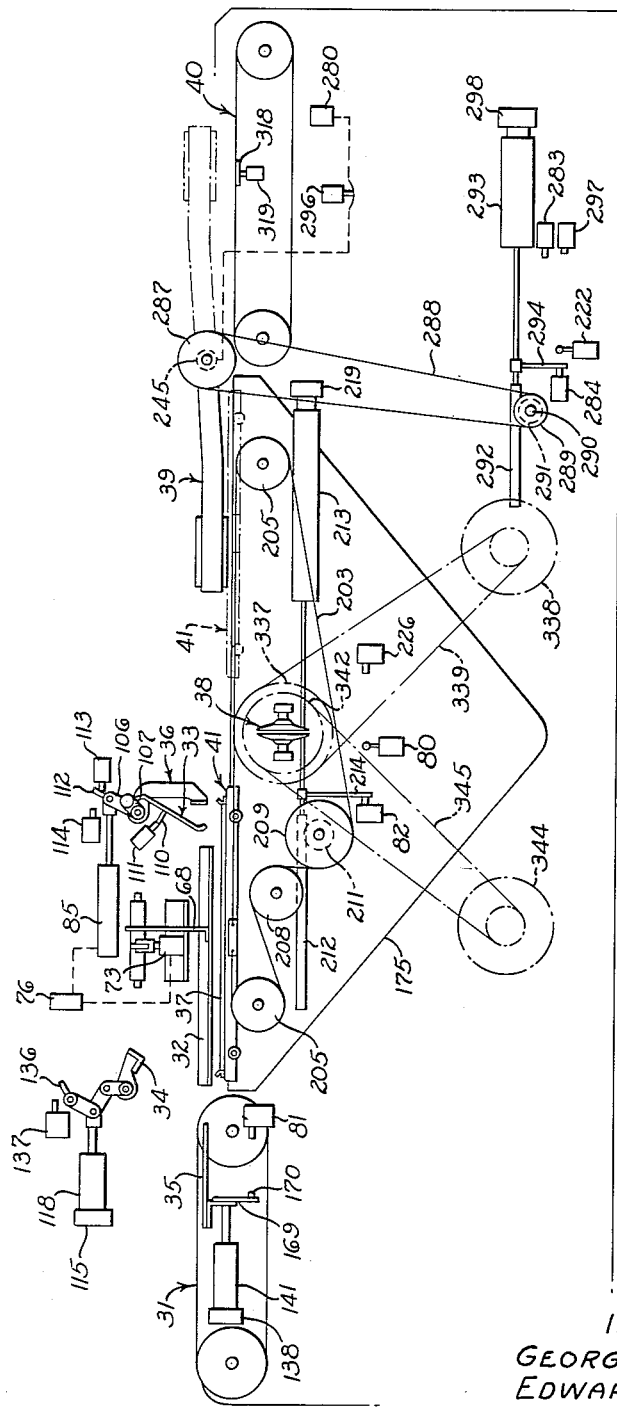

United States Patent Office
2,741,214
Patented Apr. 10, 1956

2,741,214

PAN GREASER

George E. Tench, South Pasadena, and Edward J. Williams, Burbank, Calif., assignors to Read Standard Corporation, a corporation of Delaware Application November 3, 1952, Serial No. 318,446

7 Claims. (Cl. 118—6)

The present invention relates in general to an apparatus for applying liquid coatings to articles and, since the invention finds particular utility in the baking industry as embodied in an apparatus for coating the inner surfaces of baking pans with grease, and particularly baking pans used in connection with cake dough, the invention will be considered in such connection herein as a matter of convenience with the understanding that the invention is susceptible of other embodiments and applications without departing from the spirit thereof.

In commercial cake baking, various items are made from cake dough, ranging in size from cupcakes or muffins to relatively large cakes. Various types of baking pans are used for such bakery goods. For example, a baking pan for cupcakes may be an integral structure provided with a large number of cavities each adapted to receive the cake dough for one cupcake. On the other hand, a baking pan for large cakes may be a single pan, or may comprise a pan unit or pan strap formed of as few as two individual pans secured together. As a matter of convenience, all such structures will be referred to hereinafter as baking pans and the dough-receiving cavities therein will be referred to simply as cavities.

In greasing the interior wall surfaces of the cavities of baking pans used for baking items made of cake dough, it is essential that the entire inner surface of each cavity be coated with grease. If any areas, even though small, remain uncoated, the cake dough will adhere to such areas with the result that the baked goods will stick in the cavities when depanning is attempted. Even if the adhesions are so small that the goods may be depanned successfully, small pieces will be torn out of each item as it is depanned with the result that such items may be unsalable and with the further result that scraping of the cavity walls to remove adhering pieces of baked dough is necessary before the pans can be reused. Consequently, a primary object of the invention is to provide an apparatus which will apply uniform coatings of grease to the entire inner surfaces of the pan cavities without the application of excessive quantities of grease thereto, thereby avoiding the undesirable results of nonuniform applications of grease.

In accordance with conventional practice, grease is applied to cake pans in the form of a spray produced by atomizing the grease with air under pressure. Such atomization of the grease results in the suspension of considerable quantities of grease in the air in the spraying zone, and, since air must be removed from the spraying zone continuously to offset the air entering the spraying zone as a result of the atomizing process, considerable quantities of grease in suspension in the air are removed from the spraying zone also. Removal of such entrained grease is a serious problem and frequently not all of it can be removed with the result that stacks through which the grease-laden air is exhausted rapidly become fouled with grease. In severe cases, surrounding buildings may even become heavily coated with grease, all of which is obviously undesirable. Consequently, an important object of the invention is to provide an apparatus which avoids the foregoing disadvantages of prior practice by avoiding the use of pneumatic spraying.

More particularly, an important object of the invention is to provide an apparatus which utilizes purely mechanical means for distributing the grease over the inner surfaces of the pan cavities so that it is unnecessary to remove any air from the grease-applying zone or chamber. Consequently, any suspension of grease in the air within the grease-applying zone is of no significance since it is unnecessary to remove any air from such zone, any grease in suspension in the air within the grease-applying zone or chamber ultimately settling to the bottom thereof, which is an important feature of the invention.

Another object of the invention is to provide an apparatus having a closed grease-applying zone or chamber within which the grease distributor is disposed and one wall of which includes a mask adapted to carry a baking pan to be greased, the mask having apertures therein which register with the mouths of the cavities in the baking pan so that grease distributed by the grease distributor enters the cavities in the baking pan and coats the inner surfaces thereof through the apertures in the mask. The impervious areas of the mask surrounding the apertures therethrough stop the grease impinging thereon so that only the inner surfaces of the cavities themselves receive grease. Thus, with this construction, the grease distributor is completely enclosed so that all of the grease distributed thereby impinges either on the walls of the grease-applying chamber, on the mask, or on the inner surfaces of the pan cavities, so that none of the grease can escape from the chamber, which is an important feature. Preferably, the grease-applying chamber constitutes a sump containing a supply of grease to be distributed so that any grease which is not applied to the inner surfaces of the pan cavities ultimately returns to the reservoir of grease within the sump, which is an important feature also.

Another object is to provide an apparatus wherein the pan-carrying mask, which is preferably located above the distributor and forms part of the upper wall of the grease-applying chamber, is movable relative to the grease distributor so that a complete traverse of the pan by the grease distributor is made as the pan moves past the distributor. While the pan-carrying mask is preferably made movable relative to the grease distributor, the distributor itself may, as an alternative, be made movable relative to the pan-carrying mask if desired.

An important object of the invention is to provide a centrifugal distributor which includes one or more rotatable distributor elements each having a grease passage communicating with the center thereof, so that grease may be delivered to the centers of the rotatable distributor elements by way of such grease passages, the distributor elements distributing the grease delivered thereto by centrifugal action.

Another object is to provide a centrifugal distributor element which is hollow and generally cone-shaped, the cone-shaped distributor element being rotatable about its axis and the grease passage communicating with the interior of the cone-shaped distributor element at its apex. Thus, the grease delivered to the interior of the cone-shaped distributor element flows radially and axially along the inner surface of the distributor element and is discharged generally radially with a tangential component, in the form of a continuous sheet of grease from the rim or periphery of the distributor element.

An important object is to provide the inner surface of the cone-shaped distributor element with at least one annular shoulder over which the grease must flow in moving from the grease passage to the periphery of the distributor element so as to distribute the grease uniformly circumferentially of the distributor element, thereby assuring the formation of a continuous and uninterrupted, generally radial sheet of grease from the rim of the distributor element.

Another object is to provide in the grease passages to the distributor elements valves for properly proportioning the delivery of grease thereto, the valves being adjustable to produce sheets of grease of sufficient thickness to completely coat the interior surfaces of the pan cavities with grease without applying excessive amounts of grease thereto.

Another and important object of the invention is to provide such a valve which includes an axially compressible sleeve of rubber, or other suitable material, which is confined against outward radial expansion so that it expands radially inwardly when axially compressed to reduce the internal cross-sectional area of the sleeve. Thus, by varying the extent to which this sleeve is axially compressed, the proportion of grease delivered to the corresponding distributor element may be controlled readily. This valve of the invention may be used particularly advantageously where the grease contains appreciable quantities of flour, which is frequently the case. Conventional valves frequently become clogged with flour under such circumstances, whereas the valve of the invention, by providing a smooth orifice of variable area, is not subject to clogging, which is an important feature.

Another important object of the invention is to mount the rotatable distributor elements of the invention on a frame which is also rotatable, the grease distributor elements being rotatable about axes which extend transversely of the axis of rotation of the frame and which are preferably, but not necessarily, at right angles thereto. With this construction, as the frame carrying the rotatable distributor elements rotates, the generally radial sheets of grease discharged from the rims of the distributor elements revolve about an axis parallel to their planes so that the sheets of grease continuously sweep across the pan-carrying mask and thoroughly coat the interior surfaces of the cavities in the pan, which is an important feature of the invention. Also, as the frame rotates, the trajectory of the grease sheet, which has a tangential component, reverses every 180° of frame rotation to insure uniform grease application to the pan cavities.

Another object is to provide a grease distributor wherein the rims of alternate distributor elements are offset laterally from the rims of the distributor elements therebetween so as to provide a plurality of spaced sheets of grease. With this construction, a plurality of laterally spaced, overlapping sheets of grease are formed to prevent interference between the sheets, which is an important feature.

Other important objects of the invention include the provision of an apparatus which automatically delivers baking pans to the mask in sequence and positions them thereon, which automatically causes the mask to traverse the grease distributor and to return to its initial, pan-receiving position, and which automatically removes the greased pans from the mask and rights them, the righted pans preferably being placed on an outlet or discharge conveyor.

Another object is to provide an apparatus having an inlet conveyor which includes a trigger engageable by a baking pan delivered to the apparatus by the inlet conveyor and which includes a gate upstream from the trigger and actuable by the trigger to intercept and restrain a following pan until the preceding one has been disposed of.

Another object is to provide a pusher actuable by the gate upon movement thereof into its extended position for advancing the pan passed by the gate into engagement with a locator positioned downstream from the trigger, the pan being directly above the mask when the pan is in engagement with the locator and when the mask is in pan-receiving position.

Another object is to provide an apparatus wherein the pan is carried by retractable rails when it is in engagement with the locator and when it is above the pan-receiving position of the mask so that, when the rails are retracted, the pan drops downwardly onto the mask, locating means being provided on the mask and the pan to accurately align the mouths of the pan cavities with the apertures in the mask.

Another object is to provide means for retracting the locator as the pan is dropped onto the mask and for energizing means for moving the mask across the grease distributor so that the interior surfaces of the pan cavities are coated with grease by the distributor as the pan-carrying mask makes its traverse.

Still another object is to provide turnover means engageable with the pan on the mask for removing the pan from the mask after the mask has made its traverse across the grease distributor and for righting the pan and placing it in righted position on the discharge conveyor.

The foregoing objects and advantages of the present invention, together with various other objects and advantages thereof which will become apparent, may be attained with the exemplary embodiment of the invention which is illustrated in the accompanying drawings and which is described in detail hereinafter.

Referrings to the drawings:

Fig. 1 is a plan view of a cake pan greasing apparatus embodying the invention;

Fig. 2 is a sectional view taken along the arrowed line 2—2 of Fig. 1;

Fig. 3 is an enlarged, fragmentary sectional view taken along the arrowed line 3—3 of Fig. 1;

Fig. 4 is a fragmentary elevational view taken as indicated by the arrowed line 4—4 of Fig. 3;

Fig. 5 is an enlarged, fragmentary sectional view taken along the arrowed line 5—5 of Fig. 2;

Fig. 6 is an enlarged, fragmentary sectional view taken along the arrowed line 6—6 of Fig. 2;

Fig. 7 is a fragmentary sectional view taken along the arrowed line 7—7 of Fig. 6;

Fig. 8 is an enlarged, fragmentary sectional view taken along the arrowed line 8—8 of Fig. 2;

Fig. 9 is a enlarged, fragmentary sectional view taken along the arrowed line 9—9 of Fig. 8;

Figure 10:
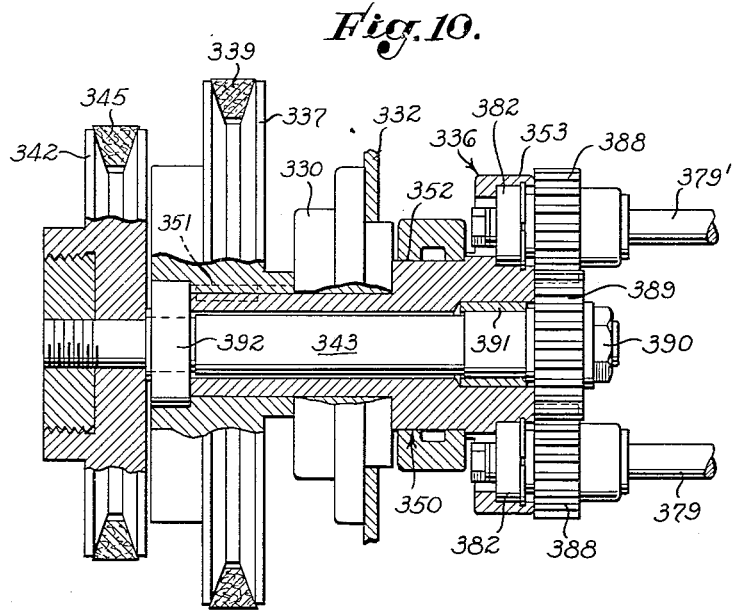
Figure 11:
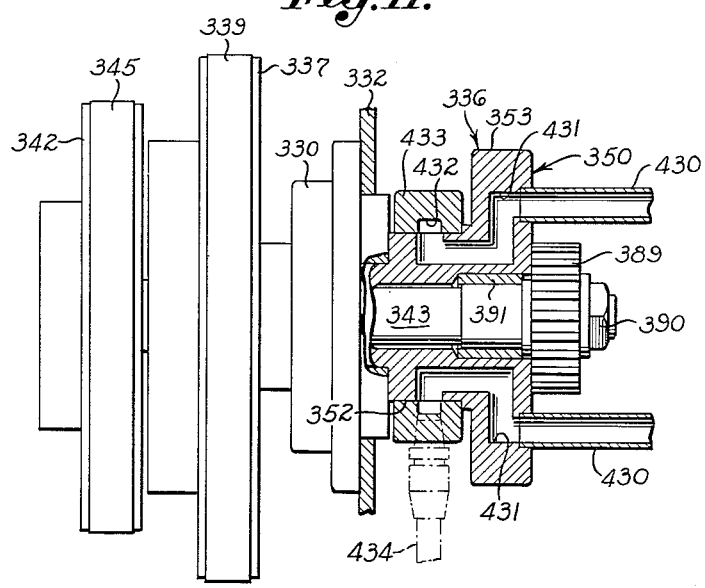
Figure 12:
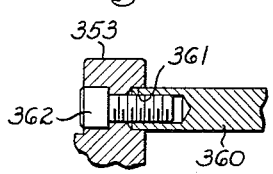
Figure 25:
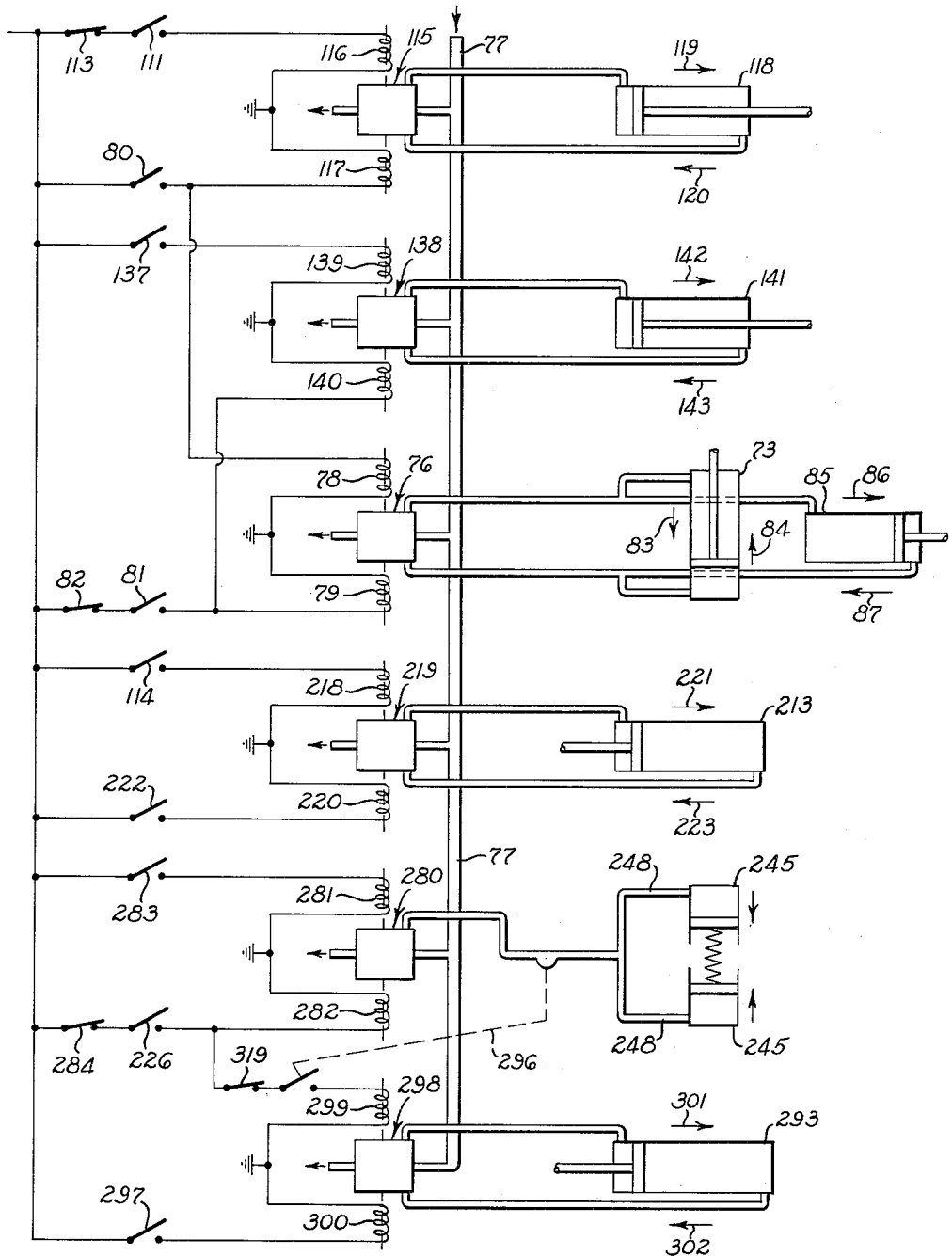

Figs. 10, 11 and 12 are fragmentary sectional views taken respectively along the arrowed lines 10—10, 11—11 and 12—12 of Fig. 9;

Figs. 13, 14 and 15 are enlarged, fragmentary sectional views respectively taken along the arrowed lines 13—13, 14—14 and 15—15 of Fig. 8;

Fig. 16 is a fragmentary sectional view taken along the arrowed line 16—16 of Fig. 15;

Fig. 17 is an enlarged, fragmentary sectional view duplicating a portion of Fig. 15 on an enlarged scale and illustrating a valve of the invention;

Fig. 18 is an enlarged, fragmentary sectional view taken along the line 18—18 of Fig. 8;

Fig. 19 is an enlarged, fragmentary sectional view taken along the arrowed line 19—19 of Fig. 1;

Fig. 20 is an enlarged, fragmentary sectional view taken along the arrowed line 20—20 of Fig. 19;

Fig. 21 is an enlarged, fragmentary sectional view taken along the arrowed line 21—21 of Fig. 2;

Figs. 22 and 23 are fragmentary sectional views respectively taken along the arrowed lines 22—22 and 23—23 of Fig. 21;

Fig. 24 is a simplified diagrammatic view of the apparatus of the invention; and Fig. 25 is a simplified diagrammatic view illustrating electrical and pneumatic circuits of the apparatus of the invention.

In the drawings, the invention is illustrated as embodied in an apparatus for greasing pans one at a time, pans being delivered to the apparatus in single file. However, it will be understood that the invention may also be embodied in an apparatus for greasing several pans at once. For example, the apparatus may be designed to handle several pans abreast, the pans being delivered to the apparatus in ranks in this case.

Before considering the embodiment of the invention which is illustrated in the drawings in detail, the structure and operation thereof will be described in a very general way with particular reference to Fig. 24 of the drawings so that the detailed structure and operation of the apparatus may be understood more readily. Referring to Fig. 24, the pan greasing apparatus illustrated in the drawings includes an inlet conveyor 31 which receives inverted pans in single file from any suitable source, not shown, such as another conveyor aligned with the conveyor 31. The inlet conveyor 31 discharges each pan onto rails 32 which extend longitudinally of the conveyor 31 and which are movable laterally between extended and retracted positions, only one of the rails being visible in Fig. 24. As each pan is propelled along the rails 32 by the inlet conveyor 31, it encounters and actuates a trigger 33 which, in turn, produces movement of a gate 34 from a retracted position to an extended position to intercept the next pan in the file delivered to the inlet conveyor 31. Movement of the gate 34 to its extended position results in actuation of a pusher 35, which moves the pan along the rails 32 into engagement with a locator 36. After the pan has been positioned by the locator 36, the locator is moved to a retracted position and the rails 32 are retracted so as to drop the pan onto a mask 37 which rests on a mask carriage 41. Subsequently, the mask is moved from the position shown in solid lines in Fig. 24 to the position shown in broken lines therein, the mask traversing a grease distributor 38 in the process so that the inner surfaces of the cavities in the pan are coated with grease. When the mask carriage 41 reaches the broken-line position in Fig. 24, a turnover means 39 lifts the greased pan from the mask 37, rights it, and deposits it on an outlet conveyor 40, the latter leading to any suitable point of disposal, such as another conveyor, not shown, which may lead to panning apparatus for filling the pan cavities with cake dough. Each succeeding pan is handled by the apparatus in a similar manner.

The structure of the various elements which actually handle the pans as they move from the inlet conveyor 31 to the outlet conveyor 40 will now be considered in detail, leaving the details of the grease distributor 38 for subsequent consideration.

*Pan handling elements*

Referring particularly to Figs. 1 to 3 of the drawings, the apparatus of the invention includes a frame 46 on which the various elements of the apparatus are mounted and which is enclosed by a housing 47, various sections of the latter having been removed or broken away throughout the drawings for clarity. The inlet conveyor 31 includes two endless conveyor elements 48 respectively trained around sprockets 49 carried by shafts 50, the latter being carried by suitable bearings mounted on the frame 46. Fixed on one of the shafts 50 is a drive sprocket 51 around which is trained a chain 52, the latter also being trained around an output sprocket 53 of a speed reduction unit 54. The latter is driven by an electric motor 55 through a belt 56 trained around an input pulley 57 of the unit 54 and a pulley 58 on the motor shaft. The motor 55 is connected in the electric circuit of the apparatus in any suitable manner, not shown.

As best shown in Fig. 1 of the drawings, guides 64 for centering each pan on the inlet conveyor 31 are disposed on opposite sides thereof, these guides providing a converging inlet which displaces misaligned pans laterally into proper alignment with the inlet conveyor.

As previously indicated, the inlet conveyor 31 discharges each pan onto the rails 32 and propels it therealong into engagement with the trigger 33. Referring particularly to Figs. 6 and 7 of the drawings, the rails 32 are disposed under the edges of the pan when they are in their extended positions, the extended positions of the rails being shown in solid lines and the retracted positions thereof being shown in broken lines. The numeral 65 identifies a pan resting on the rails 32 with the rails in their extended positions and the numeral 66 identifies a pan resting on the mask 37 after retraction of the rails to drop a pan onto the mask, the pans 65 and 66 being shown in phantom. The rails 32 are illustrated as comprising angles having horizontal flanges which project under guides 67 to support the pan 65 when the rails are extended, the guides 67, which serve to center each pan relative to the rails 32, being carried by the frame 46 and being aligned with the guides 64. Each rail 32 is carried by arms 68 which are connected to a shaft 69 rotatably mounted on the frame 46. Connected to each shaft 69 is an actuating arm 70 which is biased by a spring 71 in a direction to bias the corresponding rail toward its extended position, the springs 71 being tension springs each anchored at one end to the frame 46 and at its other end to the corresponding actuating arm 70. Pivotally connected to the respective actuating arms 70 are the piston rods of actuating cylinders 73 which are connected to the frame 46. As is the case with other actuating cylinders to be described hereinafter, the actuating cylinders 73 are pneumatically operated, although actuating cylinders operated by fluids other than air may be employed if desired.

Referring to Fig. 25 of the drawings, wherein one of the actuating cylinders 73 is illustrated, these actuating cylinders are controlled by an electric valve 76. This valve, which is not illustrated in detail, is of the two-position selector valve type, and serves to connect one end of each actuating cylinder 73 to a pressure line 77 and the other end to exhaust when in one of its positions, and to reverse the connections of the ends of each cylinder 73 when in its other position. The valve 76 includes two solenoids 78 and 79 which, when energized, move the valve to its respective positions, the valve remaining in the position to which it is moved until the solenoid for moving it to its other position is energized. The solenoid 78 is controlled by a switch 80 and the solenoid 79 is controlled by switches 81 and 82 in series, the manner in which these switches are actuated being described hereinafter. When the solenoid 78 is energized by closure of the switch 80, the piston of each actuating cylinder 73 moves downwardly, as indicated by the arrow 83, to extend the corresponding rail 32, and when the solenoid 79 is energized by closure of the switches 81 and 82, the piston of each actuating cylinder 73 moves upwardly, as indicated by the arrow 84, to retract the corresponding rail 32.

Connected in parallel with the cylinders 73 is a cylinder 85 the function of which will be described hereinafter. When the solenoid 78 is energized, the piston of the cylinder 85 moves in the direction of the arrow 86, and, when the solenoid 79 is energized, the piston of the cylinder 85 moves in the direction of the arrow 87.

The pressure line 77 is connected to a suitable source of air under pressure, such as a compressor, not shown, and is common to the electric valve 76 and several other electric valves which are illustrated in Fig. 25 of the drawings and which will be described hereinafter.

Referring again to Figs. 6 and 7 of the drawings, two rotatable adjusting rods 91 are located at a level above the level of the rails 32 and are mounted in bearings 92 carried by the frame 46, these adjusting rods being spaced apart and being substantially parallel. The two adjusting rods 91 are interconnected in driving relation by a chain 93 trained around sprockets 94 fixed on the respective adjusting rods, each adjusting rod having thereon a hand crank 95. With this construction, both adjusting rods 91 rotate in unison upon manipulation of either or both of the cranks 95.

Mounted on each adjusting rod 91 is a sleeve 97 having at one end a bearing 98 and having at its other end a nut 99 threadedly engaging the corresponding adjusting rod. Thus, as either crank 95 is rotated, the two sleeves 97 move longitudinally of the adjusting rods 91 in unison. Carried by the sleeves 97 is an auxiliary frame 100 having arms 101 on which the previously mentioned actuating cylinder 85 is pivotally mounted. The actuating cylinder 85 operates the locator 36, which will now be described.

The locator 36 includes two stops 104 which are adapted to be engaged by a pan on the rails 32 when such pan is advanced along the rails by the pusher 35, the stops 104 serving to locate the pan properly with respect to the mask 37 on the mask carriage 41 as previously indicated. The stops 104 are fixed on opposite ends of a shaft 105 which is rotatably mounted on the auxiliary frame 100 in any suitable manner, this shaft having fixed thereon an arm 106 to which the piston rod of the actuating cylinder 85 is pivotally connected. Thus, whenever the actuating cylinder 85 is operated by the electric valve 76 in the manner hereinbefore described, the locator is moved between extended and retracted positions, the extended and retracted positions of the locator being shown in solid and broken lines, respectively, in Fig. 7 of the drawings. When the locator is in its retracted position, it clears the pan 66 on the mask 37 so that such pan may be moved across the grease distributor 38.

The shaft 105 carries another arm 107 on which the trigger 33 is pivotally mounted, this trigger being biased on the clockwise direction, as viewed in Fig. 7, by any suitable means, such as a spring, not shown. When the shaft 105 is rotated to retract the locator 36, the trigger 33 rotates into the position shown in broken lines in Fig. 7 so as to clear the pin 66 on the mask 37.

As will be apparent, the positions of the trigger 33 and the locator 36 may be adjusted longitudinally of the rails 32 by rotation of the adjusting rods 91 to compensate for variations in the pan lengths so as to insure that each pan will be properly positioned relative to the mask 37 so that it will drop thereonto in the proper position when the rails 32 are retracted by the cylinders 73. Such adjustments of the positions of the trigger 33 and the locator 36 may be made readily by rotating one or both of the cranks 95 in the manner previously described.

As best shown in Figs. 7 and 24, the trigger 33 carries a finger 110 which holds a switch 111 open until such time as the trigger is pivoted by a pan moved into engagement therewith by the inlet conveyor 31 so that the finger 110 disengages the switch 111. As shown in Fig. 24 of the drawings, a finger 112 on the actuating arm 106 of the locator 36 holds a switch 113 closed as long as the locator is in its extended position, the finger 112 disengaging the switch 113 to permit it to open when the locator is moved to its retracted position by the actuating cylinder 85. When the locator 36 is moved into its retracted position, the finger 112 actuates a switch 114, this switch being of the type which is closed momentarily whenever it is actuated.

Referring to Fig. 25 of the drawings, the switches 80, 111 and 113 control an electric valve 115 which is identical to the valve 76, the valve 115 having solenoids 116 and 117 which, when energized, produce movement of the piston of an actuating cylinder 118 in the directions of the arrows 119 and 120, respectively. The switch 80 is in series with the solenoid 117 and the switches 111 and 113 are in series with the solenoid 116, whereby the latter is energized when the trigger 33 is engaged by a pan to close the switch 111 and the locator 36 is in its extended position to hold the switch 113 closed. The function of the cylinder 118 will be discussed hereinafter.

Considering now the gate 34, and referring particularly to Figs. 3 and 4 of the drawings, the gate is mounted on an auxiliary frame 125 which is adjustable vertically in a manner to be described so as to adjust the position of the gate vertically to accommodate pans of different depths. In the particular construction illustrated, the gate 34 takes the form of an angle which is carried by arms 126 fixed on a shaft 127, the latter being rotatably mounted on the auxiliary frame 125. Extending from the shaft 127 are arms 128 which receive therebetween and are pivotally connected to a link 129, the latter being disposed between and being pivotally connected to arms 130 fixed on a shaft 131 which is rotatably mounted on the auxiliary frame 125 also. The shaft 131 also carries an arm 132 to which is pivotally connected the piston rod of the actuating cylinder 118, which is pivotally mounted on arms 133 extending from the auxiliary frame 125. As best shown in Fig. 3 of the drawings, when the piston rod of the actuating cylinder 118 is moved to the left, the gate 34 is pivoted into its retracted position, shown in broken lines and, when the piston rod of this cylinder is moved to the right, the gate 34 is pivoted downwardly into its extended position to intercept a pan on the inlet conveyor 31 as previously indicated.

The shaft 131 carries a finger 136 which engages a switch 137 when the gate 34 is moved to its extended position, the switch 137 being of the type which closes only momentarily when actuated. Referring particularly to Fig. 25, the switches 81, 82 and 137 control an electric valve 138, this valve having solenoids 139 and 140 and controlling an actuating cylinder 141 the piston of which is moved in the direction of the arrow 142 when the solenoid 139 is energized and in the direction of the arrow 143 when the solenoid 140 is energized. Thus, when the gate 34 is extended, the switch 137 is closed to move the piston of the cylinder 141 in the direction of the arrow 142, this cylinder controlling the pusher 35 in a manner to be described. On the other hand, when the switches 81 and 82 are closed in the manner to be discussed hereinafter, the piston of the cylinder 141 moves in the direction of the arrow 143.

Considering the vertical adjustment of the frame 125 to adjust the gate 34 vertically, the auxiliary frame is mounted on two vertical shafts 147 which are rotatable in bearings 148 carried by the main frame 46. Threaded on the shafts 147 are nuts 149, Figs. 2 and 5, to which are connected sprockets 150. These sprockets are driven by a sprocket 151 through a chain 152, Fig. 5, which is trained around the sprockets 150 and 151 and around an idling sprocket 153. The sprocket 151 has a hand crank 154, Fig. 2, connected thereto. As will be apparent, rotation of the crank 154 produces rotation of the nuts 149 to move the shafts 147 vertically so as to adjust the vertical position of the gate 34 to compensate for variations in the depths of the pans to be greased.

Referring now to Figs. 1 and 3 of the drawings, the pusher 35 includes two fingers 159 which are connected at their rearward ends to an angle 160 and which rest on a ledge 161 carried by the frame 46 and sloping downwardly to the rails 32, the forward ends of the fingers 159 being adapted to engage a pan on the rails 32 to push it into engagement with the locator 36. The actuating cylinder 141 for the pusher 35 is rigidly connected to an angle 162 which forms part of the frame 46, the piston rod of the actuating cylinder 141 being rigidly connected to the angle 160 of the pusher 35 by nuts 163 threaded onto the piston rod on opposite sides of the angle 160. Additional support is provided by an arm 164 pivotally connected at one end to an ear 165 on the pusher and slidable at its other end in a rotatable element 166 carried by the frame 46. The slidable connection between the arm 164 and the element 166 permits rectilinear movement of the point of pivotal connection of the arm 164 to the ear 165.

The pusher 35 carries a finger 169, Fig. 3, having thereon an adjusting screw 170 which engages the switch 81 when the pusher reaches the limit of its travel. The adjusting screw 170 is provided to provide for correlation of the action of the switch 81 with engagement of a pan with the locator 36. As previously discussed, the switch 81, together with the switch 82, control the valve 76, the piston of the cylinder 73 moving in the direction of the arrow 84, Fig. 25, to retract the rails 32 and the piston of the cylinder 85 moving in the direction of the arrow 87 to retract the locator 36 when both the switches 81 and 82 are closed. Also, when both of these switches are closed, the valve 138 is actuated to produce movement of the piston of the cylinder 141 in the direction of the arrow 143 to retract the pusher 35. The switch 82 is closed when the mask carriage 41 is at one end of its travel and in position to receive a pan to be dropped thereonto from the rails 32, as will be discussed hereinafter.

As best shown in Fig. 2 of the drawings, the grease distributor 38 is disposed adjacent the top of and centrally of a greasing chamber or sump 175 which extends across the machine, the sump being V-shaped in cross section in the particular construction illustrated. With this construction, the grease discharged by the distributor 38 continuously drains downwardly into the apex of the sump 175, except for that relatively small portion of the grease discharged by the distributor which is applied to the inner surfaces of the pan cavities.

Referring now to Fig. 7 of the drawings, the walls of the sump 175 completely enclose the grease distributor 38, except for a discharge opening 176 in the upper wall of the sump directly above the grease distributor. This discharge opening extends across the machine and is of substantially the same length as the pans to be greased, the mask 37 with the pan 66 thereon being adapted to traverse the discharge opening 176 so that the inner surfaces of the cavity or cavities in the pan are coated with grease discharged from the distributor. As will be apparent, in order to prevent grease from being discharged upwardly into the atmosphere through the discharge opening 176, it is essential that the discharge opening be covered at all times, either by the mask 37 carrying the pan 66, or by other elements, and the manner in which this is done will now be considered in detail.

Continuing to refer to Figs. 6 and 7 of the drawings in particular, the mask 37 is illustrated as comprising a plate or sheet having apertures 177 therein with which the mouths of the cavities in the pan 66 register when the pan rests on the mask in inverted position, the number of apertures in the mask and their locations matching the number and locations of the cavities in the pan. In order to maintain the mouths of the cavities in the pan in registry with the apertures 177, locating means are provided. In the particular construction illustrated, such locating means take the form of clips 178 carried by the mask carriage 41 and engageable with the sides of the pan and the edges of the mask 37, these clips having downwardly and inwardly sloping surfaces which guide the pan into position as it drops from the rails 32 in the manner previously described. If desired, other locating means, not shown, such as tapered pins on the mask carriage 41 insertable into holes in the mask 37 and the pan, may be utilized. With this construction, the mask 37 may be changed readily for different pans, which is an important feature.

As best shown in Fig. 6, the mask carriage 41 is provided at its ends with downturned flanges 179 which carry rollers 180 disposed between upper and lower tracks 181 and 182. These tracks extend from one side of the discharge opening 176 to the other and guide the mask carriage 41 from its pan-receiving position, wherein it is disposed beneath the rails 32, to its pan-discharging position, wherein the greased pan is accessible to the turnover means 39.

As best shown in Fig. 7 of the drawings, slidable on and resting on the upper wall of the sump 175 are masking elements 185 and 186 which cooperate with the pan carrying mask 37 to keep the discharge opening 176 in the upper wall of the sump covered at all times. The masking element 185 is provided with an upturned flange 187 which is engageable with a downturned flange 188 along the forward or leading edge of the mask carriage 41 and with an upturned flange 189 on the masking element 186.

The flange 189 is also engageable with a downturned flange 190 on the rearward or trailing edge of the mask carriage 41. The masking element 185 is continually biased toward the right, as viewed in Fig. 7 of the drawings, to hold the flanges 187 and 188 in engagement so that no grease can escape between the mask 37 and the masking element 185. As shown in Figs. 19 and 20, the masking element 185 has connected thereto a chain 191 which is trained around and secured to a sprocket 192, the latter being biased in the clockwise direction, Fig. 19, by a torsion spring 193 which is anchored at 194 to the sprocket and at 195 to the frame 46. The sprocket 193 is journalled on a shaft 196 which is carried by the frame 46 and which carries an arbor 197 around which the torsion spring 193 is coiled, the stationary end of the torsion spring actually being anchored to the arbor and the latter being fixed to the shaft 196 which, in turn, is keyed to the frame. Thus, the torsion spring 193 exerts a continuous force on the masking element 185 toward the right, as viewed in Figs. 7 and 19, to maintain the flange 187 on this masking element in engagement with the flange 188 on the mask carriage 41 for any position of the mask carriage 41 along the tracks 181 and 182. In other words, as the mask carriage 41 moves back and forth across the discharge opening 176, the torsion spring 193 keeps the masking element 185 in contact with the mask carriage to prevent leakage of grease therebetween.

Continuing to refer particularly to Fig. 7 of the drawings, as the mask carriage 41 with the mask 37 thereon moves to the right across the discharge opening 176, the masking element 186 remains stationary so that the masking elements 185 and 186 separate to permit the application of grease to the inner surfaces of the pan cavities as the pan traverses the discharge opening 176. After the mask carriage has been moved a distance substantially equal to its width so that the trailing portions of the mask and the pan carried thereby are exposed to the discharge opening 176, the flange 190 at the trailing edge of the mask carriage engages the flange 189 on the masking element 186 so that the mask carriage pulls the masking element 186 along with it, whereupon the masking element 186 covers the discharge opening 176 as the pan-carrying mask moves past the discharge opening to the pan-discharging position wherein the greased pan is accessible to the turnover means 39, the pan-discharging position of the mask carriage being shown in phantom in Fig. 24 of the drawings. Thus, as the mask carriage 41 carrying a pan to be greased is moved toward the right, as viewed in Fig. 7 of the drawings, the discharge opening 176 is covered first by the masking element 185, then by the pan-carrying mask 37 itself, and, lastly, by the masking element 186.

During movement of the empty mask 37 to the left after a greased pan has been removed therefrom by the turnover means 39, the masking element 186 remains stationary over the discharge opening 176 during the initial leftward movement of the mask carriage 41. At the same time, as the mask carriage 41 starts to move toward the left, as viewed in Fig. 7, the flange 188 thereon engages the flange 187 on the masking element 185 so that the mask carriage drags the masking element 185 along with it in opposition to the action of the torsion spring 193. Ultimately, the flange 187 on the masking element 185 engages the flange 189 on the masking element 186 to return the masking element 186 to its original position, as shown in Fig. 7.

Thus, during the return movement of the empty mask carriage with the mask 37 thereon from its pan-discharging position to its pan-receiving position, the discharge opening 176 in the upper wall of the sump is covered first by the masking element 186, then by the masking elements 185 and 186 jointly, and, lastly, by the masking element 185 alone.

Thus, the masking elements 185 and 186 cooperate with a pan carried by the mask 37 to cover the discharge opening 176 at all times during movement of the mask carriage 41 from its pan-receiving position to its pan-discharging position, and cooperate with each other to cover the discharge opening at all times during return movement of the empty mask, whereby the escape of grease into the atmosphere through the discharge opening 176 is prevented, which is an important feature of the invention.

Considering the structure for moving the mask carriage 41 between its pan-receiving and pan-discharging positions, two chains 203 are connected to blocks 204, respectively, which, in turn, are secured to the mask carriage, the upper runs of these chains being supported by the lower tracks 182 on which the rollers 180 rest. At the ends of the upper runs of the chains 203 are sprockets 205 carried by shafts 206 rotatably mounted in suitable bearings on the frame 46, these sprockets and shafts being disposed within the sump 175 and extending upwardly through slots in the upper wall thereof to permit the chains to pass through the upper wall of the sump. Grease discharged by the distributor 38 is prevented from reaching such slots by baffles 207 respectively located on opposite sides of the discharge opening 176. The chains 203 are trained around idling sprockets 208, and as best shown in Fig. 24 of the drawings, are trained around drive sprockets 209 which are fixed on a shaft 210 carried by suitable bearings on the frame 46. The shaft 210 has fixed thereon a gear 211 which meshes with a rack 212 connected to the piston rod of an actuating cylinder 213. The cylinder 213 is secured to the frame 46 of the machine in a manner not specifically shown.

As will be apparent, reciprocation of the piston in the cylinder 213 results in reciprocation of the rack 212 to move the chains 203 first in one direction and then the other, whereby the chains produce reciprocatory movement of the mask carriage 41 and the mask 37 between the pan-receiving position beneath the rails 32 and the pan-discharging position adjacent the turnover means 39. As the mask cylinder 213 operates, a finger 214 on its piston rod actuates three switches which will now be considered with reference to Figs. 24 and 25 of the drawings.

First, when the rack 212 is at the extreme left end of its travel so that the mask carriage 41 is in its pan-receiving position beneath the rails 32, the finger 214 on the piston rod of the cylinder 213 holds the switch 82 closed. Thus, when a pan has been pushed into engagement with the locator 36 by the pusher 35 so that the switch 81 is closed, and when the mask carriage 41 is in pan-receiving position so that the switch 82 is closed, the cylinders 73, 85 and 141 are energized in the directions of the arrows 84, 87 and 143, respectively, so as to retract the rails 32, retract the locator 36 and return the pusher 35 to its retracted position. Retraction of the rails 32, of course, results in the dropping of a pan onto the mask 37.

As the locator 36 is retracted, the switch 114 is closed momentarily in the manner described previously to energize a solenoid 218 of an electric valve 219 having an opposing solenoid 220. Energization of the solenoid 218 upon closure of the switch 114 results in movement of the piston of the cylinder 213 in the direction of the arrow 221, energization of the solenoid 220 upon closure of a switch 222 in series therewith resulting in movement of the piston and the cylinder 213 in the direction of the arrow 223. Consequently, as the switch 114 is closed momentarily upon retraction of the locator 36, the mask carriage 41 starts on its way from the pan-receiving position to the pan-discharging position. As the mask carriage 41 moves toward its pan-discharging position, the finger 214 on the piston rod of the cylinder 213 actuates the switch 80 in passing so as to move the piston of the cylinder 118 in the direction of the arrow 120 and so as to move the pistons of the cylinder 73 and 85 in the direction of the arrows 83 and 86, respectively. Such momentary closure of the switch 80 thus results in retraction of the gate 34 to pass another pan to the rails 32, results in extension of the rails to receive such pan, and results in extension of the trigger 33 and the locator 36 into positions to be engaged by such pan. When the mask carriage 41 reaches its pan-discharging position adjacent the turnover means 39, the finger 214 on the piston rod of the mask cylinder 213 closes a switch 226 which, together with other elements to be described in the following paragraphs, controls the operation of the turnover means 39.

Referring now to Figs. 21 to 23 of the drawings, the turnover means 39 includes a shaft 230 which includes telescoped sections 231 and 232 biased apart by a compression spring 233, the shaft section 231 having enlargements 234 which makes a sliding fit with the wall of an axial counterbore 235 in the shaft section 232. The spring 233 is disposed in and seats against the bottom of a bore 236 at the inner end of the counterbore 235, the other end of this spring being seated against the inner end of the shaft section 231. The shaft section 232 is provided with a flange 237 having holes therethrough for fingers 238 on a flange 239 on the shaft section 231. These fingers serve to key the two shaft sections 231 and 232 together against relative rotation while permitting relative axial movement thereof.

The shaft 230 is carried by bearings 243 in which reduced diameter portions 244 of the shaft sections 231 and 232 are journalled, the bearings 243 being carried by actuating cylinders 245 which are bolted or otherwise secured to the frame 46 of the machine. The reduced diameter portions 244 of the shaft sections 231 and 232 terminate in pistons 246 which are disposed in the cylinders 245, respectively, and which are actuable by air under pressure delivered to the cylinders 245 through passages 247 and lines 248 to telescope the shaft sections 231 and 232 together.

The shaft sections 231 and 232 respectively carry spaced arms 251 having thereon clamping means 252 adapted to receive and clamp a greased pan therebetween. Each clamping means 252 includes a clamp 253 of channel-shaped cross section which is adapted to fit over one end of the pan, a pan 254 being illustrated as clamped between the two clamps 253 in Fig. 22. It will be noted that the lower leg of each clamp 253 is tapered to a relatively sharp edges to facilitate insertion between the mask 37 and a pan on the mask. Each clamp 253 is provided with pins 255 and 256 respectively disposed in a bore 257 in the corresponding arm 251 and a bore 258 through the corresponding arm. The clamps 253 are biased toward each other by plungers 259 engaging the respective clamps and disposed in recesses 260 in the respective arms 251, each recess containing a spring 261 which is seated against a corresponding plunger and which encircles a stem 262 thereof. The stems 262 extend through the end walls of the recesses 260 and are provided with nuts 263 thereon to retain the plungers. The pins 255 and 256 are retained in their respective bores 257 and 258 by a head 266 on each pin 256, the heads 266 being engageable with slides 267 to limit movement of the clamps 253 toward each other under the influence of the springs 261. Each slide 267 has a notch 268 therein which receives a stem 269 of the corresponding pin 256 so that the corresponding head 266 may engage the slide to act as a stop. Each slide is guided by a pin 270 which is carried by the corresponding arm 251 and which extends through a slot 271 in the corresponding slide, each pin 270 having a head 272 thereon to retain the corresponding slide. As will be apparent, if the slides 257 are moved to the right, as viewed in Fig. 21, they disengage the pins 256 so that the clamps 253 may be removed readily for substitution of other clamps adapted to engage a pan of a different depth. Thus, the clamps 253 may be replaced readily if pans of another depth are to be handled. Each slide 267 has a tab 273 thereon which serves as a seat for a compression spring 274, the other end of each spring being seated against a tab 275 fixed on the corresponding arm 251. Thus, in order to release one of hte clamps 253, it is merely necessary to move the corresponding tab 273 toward the corresponding tab 275 through the use of the thumb and forefinger of one hand, whereupon the corresponding clamp may be removed readily with the other hand, which is an important feature.

In order to clamp a pan between the clamps 253, it is necessary to energize the cylinders 245 so as to move the shaft sections 231 and 232 and the arms 251 carried thereby toward each other. The cylinders 245 are controlled by an electric valve 280, Fig. 25, which is movable between two positions by solenoids 281 and 282, the solenoid 281, when energized, connecting the cylinders 245 to the pressure line 77 so as to clamp a pan between the clamps 253, and the solenoid 282, when energized, connecting the cylinders 245 to exhaust so that the spring 233 separates the shaft sections 231 and 232 and thus separates the clamps 253 to release the pan, such release taking place after the pan has been inverted by the turnover means 39 and has been positioned above the outlet conveyor 40. The solenoid 281 is controlled by a switch 283 and the solenoid 282 is controlled by the switch 226 and a switch 284, which are connected in series. As previously indicated, the switch 226 is closed by the finger 214 on the piston rod of the mask cylinder 213 when the mask carriage 41 reaches its pan-discharging position adjacent the turnover means 39. The manner in which the switches 283 and 284 are actuated will be covered hereinafter.

Considering the manner in which the turnover means 39 is actuated with reference to Figs. 2, 21, and 24, and particularly the latter, the turnover means includes a sprocket 287 which is fixed on the shaft section 232. Trained around the sprocket 287 is a chain 288 which is also trained around a drive sprocket 289 on a shaft 290, the latter having fixed thereon a pinion 291 which is meshed with a rack 292 connected to the piston rod of a turnover actuating cylinder 293. As the piston in the cylinder 293 reciprocates, it rotates the turnover means from a pan-receiving position above the mask carriage 41 and the mask 37 to a pan-discharging position above the outlet conveyor 40, the pan-receiving position of the turnover means being shown in solid lines in Fig. 24 and the pan-discharging position thereof being shown in broken lines. The piston rod of the turnover cylinder 293 carries a finger 294 which holds the switch 284 closed when the turnover means 39 is in its pan-receiving position. Thus, when the mask carriage 41 is in its pan-discharging position so that the finger 214 on the piston rod of the mask cylinder 213 closes the switch 226 and when the turnover means 39 is in its pan-receiving position so that the finger 294 on the piston rod of the turnover cylinder 293 closes the switch 284, the cylinders 245 are actuated to move the clamps 253 into clamping engagement with a greased pan on the mask. As the pressure builds up in the cylinders 245, a pressure switch 296 in the line leading thereto is closed, the switch 296 and a switch 297 cooperating with the switches 226 and 284 to control an electric valve 298 which, in turn, controls the turnover cylinder 293. The valve 298 includes solenoids 299 and 300 which respectively produce movement of the piston of the turnover cylinder 293 in the directions of the arrows 301 and 302. When the switches 226 and 284 are closed, which occurs when the mask carriage 41 is in its pan-discharging position and the turnover means 39 is in its pan-receiving position as previously discussed, and when the pressure switch 296 is closed upon energization of the clamping cylinders 245, the circuit to the solenoid 299 of the valve 298 is completed to start the piston of the turnover cylinder 293 in the direction of the arrow 301, which produces movement of the turnover means from its pan-receiving position to its pan-discharging position. Such movement of the piston of the turnover cylinder 293 in the direction of the arrow 301 causes the finger 294 to close the switch 222 momentarily, as best shown in Fig. 24. This switch then produces movement of the piston of the mask cylinder 213 in the direction of the arrow 223 to start the mask carriage 41 on its way back toward its pan-receiving position. As the piston of the turnover cylinder nears the end of its stroke in the direction of the arrow 301, the finger 294 closes the switch 283, and as the finger 294 reaches the end of its stroke, the finger 294 closes the switch 297. The switch 283 actuates the solenoid 281 to cause the valve 280 to vent the clamping cylinders 245 to exhaust, thereby disengaging the clamps 253 from the righted pan so that the latter may drop onto the outlet conveyor 40. The switch 297 energizes the solenoid 300 to produce movement of the piston of the turnover cylinder 253 in the direction of the arrow 302, thereby restoring the turnover means 39 to its pan-receiving position.

Referring to Figs. 1 and 2 of the drawings, the outlet conveyor 40 includes two endless belts 305 trained around pulleys 306 carried by shafts 307 rotatably mounted in suitable bearings on the frame 46. The belts 305 are driven by an outlet conveyor motor 308 through a belt 309 trained around a pulley 310 on the motor shaft and an input pulley 311 of a speed reduction unit 312, and through a belt 313 trained around an output pulley 314 of the unit 312 and a pulley 315 fixed on one of the shafts 307. The motor 308 is connected in the electrical circuit of the apparatus in any suitable manner, not shown.

The foregoing completes the description of the structure of the apparatus of the invention, excepting the grease distributor 38 and various elements directly associated therewith. Since the grease distributor 38 does not handle the pans directly, it is convenient to consider the operation of the pan handling elements in detail before undertaking a detailed description of the structure and operation of the grease distributor.

*Operation of pan handling elements*

Referring to Figs. 24 and 25 of the drawings, it will be assumed that the inlet conveyor 31, the grease distributor 38 and the outlet conveyor 40 are in operation, but that no pans have as yet been delivered to the inlet conveyor. Under such conditions, the various elements illustrated in Figs. 24 and 25 are in the positions shown. (Those elements which are shown in both solid and broken lines are in their solid-line positions under the conditions specified.)

Now, it will be assumed that a series of inverted pans to be greased is delivered to the inlet conveyor 31 in any suitable manner, as by a supply conveyor, not shown, registering with the inlet conveyor. The first pan in the series is propelled onto the rails 32 by the inlet conveyor 31 and engages the trigger 33, whereupon the finger 110 on the trigger disengages the switch 111 to permit this switch to close. Since the switch 113 is being held closed by the finger 112 associated with the locator 36, the solenoid 116 of the valve 115 is energized to produce movement of the piston of the gate cylinder 118 in the direction of the arrow 119. Such energization of the gate cylinder results in movement of the gate 34 into its extended position to intercept the second pan in the series.

As the gate 34 is extended, the finger 136 associated therewith engages the switch 137, which closes momentarily. Such momentary closure of the switch 137 results in energization of the solenoid 139 of the valve 138 to produce movement of the piston of the pusher cylinder 141 in the direction of the arrow 142, whereby the pusher 35 engages the first pan in the series and pushes it along the rails 32 into engagement with the locator 36, the latter positioning the first pan properly above the mask carriage 41, which is in its pan-receiving position, as previously indicated.

As the pusher 35 moves the first pan in the series into engagement with the locator 36, the adjusting screw 170 carried by the finger 169 of the pusher 35 closes the switch 81. Since, as pointed out previously, the mask carriage 41 is in its pan-receiving position beneath the rails 32, the finger 214 associated with the mask cylinder 213 is holding the switch 82 closed. Thus, with the switches 81 and 82 closed, the solenoid 79 of the valve 76 is energized to produce movement of the pistons of the cylinders 73 in the direction of the arrow 84 and to produce movement of the piston of the cylinder 85 in the direction of the arrow 87. Such movement of the pistons of the rail cylinders 73 results in retraction of the rails 32 to drop the first pan in the series onto the mask 37, and such movement of the piston of the locator cylinder 85 results in retraction of the locator 36 and the trigger 33 to clear the pan on the mask. Also, closure of the switches 81 and 82 results in energization of the solenoid 140 of the valve 138 to produce movement of the piston of the pusher cylinder 141 in the direction of the arrow 143, thereby returning the pusher 35 to its retracted position. Such retraction of the pusher results, of course, in opening of the switch 81.

As the trigger 33 and the locator 36 are retracted, the finger 112 associated therewith opens the switch 113 and closes the switch 114, this switch being of the type which closes only momentarily when actuated. Such momentary closure of the switch 114 results in energization of the solenoid 218 of the valve 219 to produce movement of the piston of the mask cylinder 213 in the direction of the arrow 221, which starts the mask carriage 41 on its way from its pan-receiving position toward its pan-discharging posiiton. The inner surfaces of the cavities in the first pan of the seires are greased by the distributor 38 as the mask 37, and the pan carried thereby, traverse the discharge opening 176 in the upper wall of the sump 175.

As the mask carriage 41 and the mask 37, and the pan carried thereby, move from the pan-receiving position of the mask carriage toward the pan-discharging position thereof, the finger 214 associated with the mask cylinder 213 closes the switch 80 momentarily. Such momentary closure of the switch 80 results in energization of the solenoid 117 of the valve 115 and in energization of the solenoid 78 of the valve 76. When the solenoid 117 is energized in this manner, the piston of the gate cylinder 118 moves in the direction of the arrow 120 to retract the gate 34 again, thereby permitting the second pan in the series to move toward the rails 32. At the same time, energization of the solenoid 78 results in movement of the pistons of the rail cylinders 73 in the direction of the arrow 83 to extend the rails into positions to receive the second pan released by the gate 34. Also, energization of the solenoid 78 results in movement of the piston of the locator cylinder 85 in the direction of the arrow 86 to restore the trigger 33 and the locator 36 to their respective extended positions.

The foregoing completes one cycle of the operation of the rails 32, the trigger 33, the gate 34, the pusher 35 and the locator 36, together with the associated cylinders 73, 85, 118 and 141 and the associated switches. These elements then commence their second operating cycle on the second pan of the series, but such second operating cycle is interrupted when it reaches the point requiring closure of the switch 82. This switch remains open until the mask carriage 41 has completed its movement to its pan-discharging position and has returned to its pan-receiving position so as to close the switch 82. The balance of the operating cycle of the mask carriage 41 will now be considered.

When the mask carriage 41 reaches its pan-discharging position, the cavities of the pan carried by the mask 37 having been greased by this time, the finger 214 associated with the mask cylinder 213 closes the switch 226. Since the turnover means 39 is in its pan-receiving position to receive the greased pan from the mask 37, the switch 284 in series with the switch 226 is being held closed by the finger 294 associated with the turnover cylinder 293. With these switches closed, the solenoid 282 of the valve 280 is energized to energize the clamping cylinders 245, whereupon the clamps 253 engage the greased pan on the mask 37. As soon as pressure builds up in the clamping cylinders 245, the pressure switch 296 is closed to energize the solenoid 299 of the valve 298 through the switches 226, 284 and 296. Such energization of the solenoid 299 causes the piston of the turnover cylinder 293 to move in the direction of the arrow 301, thereby rotating the turnover means 39 from its pan-receiving position toward its pan-discharging position preparatory to dumping the greased pan, in righted position, on the outlet conveyor 40. However, if a previously righted pan has not been removed by the conveyor 40, it depresses a bar 318, Fig. 24, to open a switch 319, Figs. 24 and 25, in series with the pressure operated switch 296 to delay actuation of the turnover means 39 until such preceding pan is removed.

As the turnover means 39 is moved toward its pan-discharging position, the finger 294 associated with the turnover cylinder 293 momentarily closes the switch 222, which energizes the solenoid 220 of the valve 219 to start the piston of the mask cylinder 213 in the direction of the arrow 223, thereby starting the mask carriage 41 on its way back toward its pan-receiving position. When the mask carriage returns to its pan-receiving position, the finger 214 associated with the mask cylinder 213 recloses the switch 82 which, among other things, retracts the rails 32 to drop the second pan in the series onto the mask 37, all as discussed previously.

Just before the turnover means 39 reaches its pan-discharging position, it engages and closes the switch 283, which energizes the solenoid 281 of the valve 280 to de-energize the clamping cylinders 245, the switches 226 and 284 in series with the other solenoid 282 of the valve 280 having been opened previously. Deenergization of the clamping cylinders 245 also results in opening of the pressure switch 296. Furthermore, when the clamping cylinders 245 are de-energized, the compression spring 233 between the shaft sections 231 and 232 separates the clamps 253 to drop the greased pan, which is the first pan in the series, in righted position upon the outlet conveyor 40, which delivers it to a suitable point of disposal. For example, the outlet conveyor 40 may discharge onto another conveyor, not shown, leading to a panner for filling the pan cavities with cake dough to be baked.

As the turnover means 39 reaches the limit of its rotation in the clockwise direction, as viewed in Fig. 24, the finger 294 associated with the turnover cylinder 293 engages and closes the switch 297, this taking place immediately after closure of the switch 283. Such closure of the switch 297 results in energization of the solenoid 300 of the valve 298 to start the piston of the turnover cylinder 293 on its way in the direction of the arrow 302, with the result that the turnover cylinder 293 returns the turnover means 39 to its original, pan-receiving position. When the turnover means reaches its original position, the finger 294 associated with the turnover cylinder 293 recloses the switch 284 to prepare the clamping cylinders 245 and the turnover cylinder 293 for re-energization when the second pan in the series is delivered to the pan-receiving position of the turnover means by the mask carriage 41.

The foregoing completes the description of one complete operating cycle of the machine, following the first pan in the series all the way through. The foregoing cycle is repeated for each pan. However, it is important to note that one pan does not go all the way through the machine before the second pan starts. In other words, by the time the first pan is discharged in righted position upon the outlet conveyor 40, the second pan is making its traverse of the grease distributor 38 and the third pan is being located above the pan-receiving position of the mask carriage 41. Thus, the machine is operating on at least three pans at once, performing different operation on each one, which is an important feature of the invention since it materially increases the rate at which the pans are processed.

The foregoing completes the description of the structure and operation of the various pan handling elements of the apparatus of the invention and the structure and operation of the grease distributor 38, together with the structure and operation of various associated elements, will now be taken up.

*Grease distributor 38*

Referring particularly to Fig. 8 of the drawings, side walls 324 and 325 of the sump 175 are recessed, as indicated at 326 and 327, respectively, to receive the ends of the centrifugal grease distributor 38, such recesses receiving various elements which are not directly active in distributing grease so as to insure grease distribution across the entire width of the discharge opening 176 in the upper wall of the sump by distributor elements to be described hereinafter. The recesses 326 and 327 are bounded by walls 328 and 329 which carry bearings 330 and 331, respectively, for the centrifugal distributor 38, the bearing 331 being mounted directly on the wall 329 of the recess 327 and the bearing 330 being mounted on a plate 332 which, in turn, is mounted on the wall 328 of the recess 326, as by bolts 333, for example.

In general, the centrifugal distributor 38 includes a frame 336 which is rotatable in the bearings 330 and 331 about an axis A—A and which is driven by a pulley 337 rigidly connected thereto, this pulley being driven by a motor 338 through a belt 339 trained around the pulley 337 and around a pulley 340 on the motor shaft. Carried by the frame 336 and rotatable relative thereto about parallel axes perpendicular to the axis A—A in the particular construction illustrated are centrifugal distributor elements forming parts of spinners or spinner assemblies 341, these spinners being driven, through intermediate gearing to be described, by a pulley 342 fixed on a shaft 343 the axis of which coincides with the axis A—A and which is rotatable relative to the frame 336. The pulley 342 is driven by a motor 344 through a belt 345 trained around the pulley 342 and around a pulley 346 on the shaft of this motor. The motors 338 and 344 are continuously operating, as are the conveyor drive motors 55 and 308 described previously, and are connected in the circuit of the apparatus in any suitable manner, not shown.

As best shown in Fig. 10 of the drawings, the frame 336 of the centrifugal distributor 38 includes a hub 350 which is rotatable in the bearing 330 and on which is fixed the drive pulley 337, the latter being secured to the hub 350 in any suitable manner, as by a key 351. Inwardly of the bearing 330, the hub 350 is provided with a cylindrical section 352 and, inwardly of this cylindrical section thereof, the hub is provided with an annular flange 353, these elements of the hub 350 all being integral in the particular construction illustrated. Similarly, at the other end of the centrifugal distributor 38, as best shown in Fig. 8 of the drawings, there is a hub 355 which is rotatable in the bearing 331, this hub also having a cylindrical section 356 inwardly of the bearing 331 and having an annular flange 357 inwardly of the cylindrical section 356 thereof.

Among the elements of the rotatable frame 336 of the distributor 38 are two rods or bars 360 spaced 180° apart in the particular construction illustrated, the locations of these bars being best shown in Figs. 9 and 14. The bars 360 extend between the flanges 353 and 357 of the hubs 350 and 355 and are secured at their respective ends to such flanges. For example, as best shown in Fig. 12, one end of each bar 360 extends into a recess 361 in the flange 353 and is secured to such flange by a screw 362. The bars 360 may be secured to the flange 357 on the hub 355 in a similar manner.

The spinners or spinner assemblies 341 are mounted on the bars 360 of the rotating frame 336 and alternate assemblies face in opposite directions, as best shown in Fig. 8 of the drawings. Considering the manner in which the spinners 341 are mounted on the bars 360 and referring particularly to Fig. 15 of the drawings, each spinner includes a shaft 364 having a head 365 which is seated against one of the bars 360, having a stem portion 366 of reduced diameter which extends through a hole in the bar against which the head 365 is seated, having another stem portion 367 of further reduced diameter which extends across the space between the bars 360 and which is seated against the opposite bar, and having still another stem portion 368 of still further reduced diameter which extends through a hole in the opposite bar and has a nut 369 threaded thereon. That bar 360 against which the head 365 of the shaft 364 is seated is clamped between the head 365 and a grease fitting 370 into which the stem portion 366 of the shaft 364 is threaded and which will be described in detail hereinafter. The other bar 360 is clamped between the nut 369 and the end of the stem portion 367, i. e., between the nut 369 and an annular shoulder formed at the junction of the stem portions 367 and 368. Thus, with this structure, the shaft 364, in addition to serving as part of the corresponding spinner 341, serves to space the bars 360 apart in a rigid manner, which is an important feature. Alternate ones of the spinners 341 have their shafts 364 oriented and mounted as described above, and the intermediate spinners have their shafts oriented oppositely, but mounted in the same way. Similarly, alternate grease fittings 370 are mounted and oriented as described above, and the intermediate grease fittings are mounted in the same way but oppositely oriented, as indicated by the numeral 370′ in Fig. 15 of the drawings.

Rotatable on each spinner shaft 364 is a sleeve 375 having a helical gear 376 fixed thereon, a thrust bearing 377 being disposed between the gear 376 and one end of the sleeve 375 on the one hand and the adjacent bar 360 on the other. Meshed with the gear 376 is another helical gear 378 fixed on a shaft 379 which is driven in a manner to be described hereinafter. The sleeves 375 of alternate ones of the spinners 341 are driven by identical gears on the shaft 379, and the sleeves of the intermediate spinners are similarly driven by gears upon a shaft 379′ located diametrically opposite the shaft 379 and identical thereto.

Considering the manner in which the shafts 379 and 379′ for driving the sleeves 375 of the spinners 341 are themselves driven, and referring particularly to Fig. 10 of the drawings, the shafts 379 and 379′ are rotatable in bearings 382 carried by the flange 353 of the hub 350. These shafts are also supported by and rotatable in bearings 383, Fig. 18, mounted in fittings 384 which are mounted on the bars 360, as by screws 385, for example. The fittings 384 carrying the bearings 383 are visible in Figs. 8 and 15 of the drawings, as well in Fig. 18 thereof.

Referring again to Fig. 10 of the drawings, fixed on the respective shafts 379 and 379′ are gears 388, these gears meshing with a central gear 389 which is fixed on the shaft 343, as by a nut 390. The shaft 343, which extends through the hub 350 and is rotatable in bearings 391 and 392, has the drive pulley 342 fixed thereon as previously described. Thus, as the shaft 343 is driven relative to the hub 350 by the motor 344, the gear 389 cooperates with the gears 388 to rotate the shafts 379 and 379′, the latter rotating the sleeves 375 of the spinners 341 through the gearing described previously. At the same time, the motor 338 rotates the entire frame 336 carrying the spinners 341 about the axis A—A as will be discussed in more detail hereinafter.

Referring again to Fig. 15 of the drawings, each spinner 341 includes a hollow grease distributor element 395 which is generally in the shape of a flat cone, i. e., which has the general shape of a cone having a large apex angle, each element 395 being referred to as a cone hereinafter for convenience. The cone 395 of each spinner 341 has at its apex a hub 396 which is pressed, or otherwise fixed, on the opposite end of the sleeve 375 from the helical gear 376 thereon. Thus, when the sleeves 375 of the spinners 341 are driven in the manner hereinbefore discussed, the cones 395 are rotated about the axes of the shafts 364. Grease is supplied to the center of each cone 395 through a grease passage, indicated generally by the numeral 397, which leads from the corresponding grease fitting 370 to a recess 398 within the cone, the grease passage 397 being described in more detail hereinafter. As each cone 395 rotates, the grease delivered to the central recess 398 therein by way of the grease passage 397 flows radially outwardly and is discharged from the periphery or rim of the cone in the form of a thin sheet, the radial sheets of grease discharged by the two cones visible in Fig. 15 being designated by the arrows 399. Portions of the grease sheets discharged by the cones 395 carry upwardly through the discharge opening 176 in the upper wall of the sump 175 when the spinner axes are horizontal, or approximately so, the portions of the grease sheets which extend upwardly through the discharge opening coming in contract with the inner surfaces of the pan cavities when the mask 37 carrying a pan being greased is disposed above the discharge opening 176. Of course, as the frame 336 carrying the spinners 341 rotates about its axis A—A, the radial sheets of grease discharged from the rims of the cones 395 sweep across the discharge opening 176 so that the sheets of grease sweep across the mask 37, when it is above the discharge opening, so as to insure uniform greasing of the pan cavities in a pan carried by the mask, which is an important feature of the invention.

It will be noted from Fig. 15 of the drawings that the grease discharged into the central recess 398 in each cone 395 through the grease passage 397 must flow over the lip of such central recess. This promotes uniform circumferential distribution of the grease over the inner surface of the cone 395. In order to insure completely uniform circumferential distribution of the grease over the inner surface of each cone 395, another annular shoulder 400, spaced radially outwardly from the annular shoulder provided by the central recess 398, is provided. Thus, in flowing from the discharge passage 397 to the rim of each cone 395, the grease must flow over the annular shoulder provided by the central recess 398, and over the annular shoulder 400, whereby substantially uniform circumferential distribution of the grease over the inner face of the cone is provided. This insures the formation of radial sheets of grease which are substantially uniform circumferentially so as to enhance the uniformity of grease application to the pan cavities, which is an important feature.

Considering the grease passage 397 illustrated in Fig. 15, it includes a passage 403 in the grease fitting 370 which is generally parallel to the axis of rotation A—A of the frame 336. The manner in which grease is supplied to the passages 403 in the grease fittings 370 of the various spinners 341 will be discussed hereinafter. Communicating with the passage 403 in each grease fitting 370 is a passage 404, this passage communicating at its inner end with an annular chamber 405 in the fitting 370. The chamber 405 communicates, through radial ports 406 in the shaft 364, with an annular chamber 407 in this shaft. Threaded into an outer counterbore 408 in the shaft 364 is an adjusting screw 409 which is locked in position by a nut 410, the adjusting screw 409 having in its inner end an axial bore 411 which communicates with the annular chamber 407 through radial ports 412. Thus, grease from the passage 403 in the fitting 370 ultimately reaches the bore 411 in the adjusting screw 409 through the passage elements hereinbefore described.

The adjusting screw 409 controls a valve 415 in the grease passage 397, this valve regulating the proportion of grease delivered to the corresponding cone 395 for a particular set of pressure and temperature conditions. The valve 415, as best shown in Fig. 17 of the drawings, is disposed in an inner counterbore 416 in the corresponding shaft 364, and includes a sleeve 417 of rubber-like material between two tubular collars 418 and 419, the former being seated against the bottom of the counterbore 416 and the latter being engaged by the adjusting screw 409. The valve 415 is shown in its fully open position in solid lines in Fig. 17, which means that maximum grease flow therethrough will take place for a given set of pressure and temperature conditions upstream therefrom. If the rate of flow of grease through the valve 415 is to be decreased, the adjusting screw 409 is screwed into the counterbore 408 farther, after loosening the lock nut 410. This results in axial compression of the sleeve 417 which, in turn, results in radial inward expansion thereof since it is confined against radial outward expansion by the wall of the counterbore 416. Consequently, flow is restricted since the effective cross-sectional area of the orifice provided by the valve 415 is reduced. As an example, if the adjusting screw 409 is advanced to the position shown in phantom in Fig. 17 of the drawings, the size of the orifice or passage through the sleeve 417 is reduced to that shown in phantom, it being noted that the sleeve 417, when expanded radially inwardly, provides an orifice of smooth contour therethrough.

The valve 415, by maintaining a smooth-contoured orifice therethrough for any position of the adjusting screw 409, minimizes any tendency of the valve to clog. The grease used in the baking industry frequently contains large quantities of flour, which rapidly clogs ordinary valves. However, such flour-laden grease has substantially no tendency to clog the valve 415 of the invention, which is an important feature.

Considering the remainder of the grease passage 397 leading to the center of each cone 395 with continued reference to Fig. 15 of the drawings, the valve 417 discharges into an axial bore 423 which communicates with the inner end of the counterbore 416 in the shaft 364. From the bore 423, the grease flows radially through radial ports 424 in the shaft into an annular chamber 425 in the rotating sleeve 375 on the shaft. From the chamber 425, the grease flows radially into the central recess 398 in the cone 395 through radial ports 426 in the sleeve 375.

Thus, the grease flows from the passage 403 in the fitting 370 to the central recess 398 in the cone 395 under the control of the valve 415 and by way of the various elements of the grease passage 397 described above. Considering the manner in which the grease is supplied to the passages 403 in the grease fittings 370, and referring particularly to Fig. 8 of the drawings, the grease passages 403 are interconnected by tubes 430 which extend between the fittings 370 and which are suitably connected thereto, as by being threaded thereinto. Referring to Fig. 11 of the drawings, the tubes 430 at the left end of the centrifugal distributor 38, viewed as in Fig. 8 of the drawings, communicate with passages 431 in the hub 350. The other ends of these passages communicate with an annular chamber 432 in a collar 433 encircling the cylindrical section 352 of the hub 350. Communicating with this annular chamber, i. e., the annular chamber 432, is a grease supply line 434 which leads to a suitable source of grease, as will be described. As best shown in Figs. 8 and 13, the collar 433 is held stationary by a bracket 435 which is carried by the bearing plate 332 and which extends through a hole in the wall 328 of the recess 326 described previously. The bracket 435 engages a radial projection 436 which is attached to the collar 433 by a screw 437. Thus, the hub 350 is free to rotate without rotating the collar 433. At the same time, continuous communication is maintained between the grease supply line 434 and the grease tubes 430 leading to the various fittings 370.

At the other end of the centrifugal distributor 38, i. e., at the right end thereof as viewed in Fig. 8 of the drawings, the tubes 430 adjacent the hub 355 communicate with passages 440, Fig. 14, which are similar to the passages 431 in the hub 350. Encircling the cylindrical section 356 of the hub 355 is a chambered collar 441 similar to the collar 433, a grease supply line 442 communicating with a chamber 439 in the collar 441. Rotation of the collar 441 is prevented by a bracket 443 carried by the wall 329 of the recess 327 and engaging a projection 444 on the collar 441.

With this construction, grease is supplied to both ends of the centrifugal distributor 38 so as to maintain the grease pressures at the fittings 370 of the various spinners 341 substantially uniform. Consequently, uniform radial discharges by all of the cones 395 is assured, which is an important feature of the invention.

Referring to Fig. 2 of the drawings, the two grease supply lines 434 and 442 communicate with a discharge line 447 leading from a grease pump 448, the latter having an intake line 449 which communicates with the bottom of the sump 175. The pump 448 is driven by a motor 450 through a belt 451, the speed of the pump determining the total rate of grease delivery to the spinners 341. The grease in the sump 175, which is preferably heated in any suitable manner, not shown, is continually agitated by a screw-type agitator 454 in the bottom of the sump, this agitator being driven by a motor 455 through a belt 456.

*Operation of grease distributor 38*

In operation, the frame 336 carrying the cones 395 is rotated about the axis A—A at a relatively low speed and the cones themselves are rotated about their axes at a relatively high speed. For example, the rotational speed of the frame 336 may be approximately 500 R. P. M., and the rotational speed of the cones 395 may be approximately 2500 R. P. M., although other values may be selected. The motors 338 and 344 rotate the frame 336 and the cones 395 continuously as long as the apparatus is in operation, and grease is continuously supplied to the cones 395 by the pump 448 as long as the machine is in operation, means, not shown, being provided if desired to control the rate of delivery of the grease by the pump.

Consequently, radial sheets of grease are continuously discharged by the cones 395, and such radial sheets continuously sweep across the discharge opening 176 in the upper wall of the sump 175. Thus, whenever a pan carried by the mask 37 is in registry with the discharge opening 176, the radial sheets of grease discharged by the cones 395 sweep across the mask to provide uniform greasing of the inner surfaces of the pan cavities. Thus, no ungreased spots remain in the pan cavities to produce sticking of items subsequently baked in the pan, which is an extremely important feature of the invention.

It will be understood, of course, that any grease not applied to the pan cavities is intercepted by the mask 37, the masking elements 185 and 186, the walls of the sump 175, and various other elements within the sump, all such grease ultimately draining back down into the bottom of the sump where it is accessible to the pump 448.

Thus, the present invention provides an apparatus for greasing baking pans uniformly and automatically. While an exemplary embodiment of the invention suitable for greasing baking pans has been disclosed, it will be understood that the invention is susceptible of other applications and that various changes, modifications and substitutions may be incorporated in the embodiment disclosed without departing from the spirit of the invention.

We claim as our invention:

1. In a pan greaser, the combination of: supporting structure; conveyor means carried by said supporting structure; a gate carried by said supporting structure and traversing said conveyor means and movable between retracted and extended positions; a trigger downstream from said gate and operatively connected thereto for moving said gate from its retracted position to its extended position to cause said gate to intercept a succeeding pan upon engagement of a preceding pan with said trigger; a mask forward of said conveyor means carried by said supporting structure; a locator positioned downstream from said trigger and engageable by a pan for orienting the pan above said mask; means engageable with the pan for moving same from said trigger to said locator; actuating means for said last named pan moving means; and means responsive to engagement of a pan with said trigger for energizing said actuating means.

2. In a pan greaser, the combination of: supporting structure providing a reservoir having an opening; a grease distributor in said reservoir for discharging grease through said opening; a perforate mask carried by said supporting structure and movable back and forth across said opening; a first imperforate masking element on one side of said perforate mask; means for moving said first imperforate masking element concurrently with said perforate mask; a second imperforate masking element on the opposite side of said perforate mask; and interengaging means on said perforate mask and said second imperforate masking element and on said second imperforate masking element and said first imperforate masking element for moving said second imperforate masking element over said opening during movement of said perforate mask in one direction and for moving said second imperforate masking element away from said opening during movement of said perforate mask in the opposite direction, respectively.

3. In a pan greaser, the combination of: supporting structure; a perforate mask carried by said supporting structure for supporting in inverted position a pan to be greased; a grease distributor carried by said supporting structure on one side of said mask; an actuator connected to said mask for reciprocating same relative to said grease distributor for greasing the pan supported by said mask; turnover means engageable with a pan on said mask at one limit of its reciprocating movement for removing said pan therefrom; an actuator connected to said turnover means for operating same; and means actuable by said mask actuator upon movement of said mask to said one limit of its reciprocating movement for energizing said actuator for said turnover means.

4. A pan greaser according to claim 3 wherein said turnover means carries clamping devices for engaging said pan, said pan greaser including an actuator for said clamping devices and including means actuable by said mask actuator for energizing said actuator for said clamping devices.

5. In a pan greaser, the combination of: a pan greasing station; a pan supporting mask reciprocatively movable across said pan greasing station from a pan receiving station; actuating means for reciprocating said pan supporting mask; an orienting pan support spaced above said pan supporting mask; said orienting pan support being movable between a pan supporting position and a non-supporting position to drop a pan onto said mask; actuating means for moving said orienting pan support between pan supporting and non-supporting positions; means for moving a pan along said orienting pan support; a locator in the path of movement of a pan along said orienting pan support engageable by a pan for orienting the same with respect to said mask; and means responsive to engagement of a pan with said locator for energizing the actuating means for said pan orienting support for moving the latter to non-supporting position whereby to drop said oriented pan onto said mask, and for energizing said mask reciprocating actuating means to move said mask and the oriented pan supported thereon through said greasing station.

6. In a pan greaser, the combination of: a pan greasing station; a pan supporting mask reciprocatively movable across said pan greasing station from a pan receiving station; actuating means for reciprocating said pan supporting mask; rails in said receiving station superjacent said pan supporting mask for supporting a pan above said mask, said rails being movable between an extended position for supporting a pan and a retracted position to drop a pan onto said mask; actuating means for moving said rails between their extended and retracted positions; means for moving a pan along said rails; a locator in the path of movement of a pan along said rails engageable by a pan for orienting the same with respect to said mask; actuating means for moving said locator between an extended position for engagement by a pan and a retracted position; means responsive to movement of a pan to a position along said rails engaging said locator for simultaneously energizing said rail actuating means to retract said rails whereby to drop said oriented pan onto said mask, and for energizing said locator actuating means for retracting said locator; and means responsive to retraction of said locator for energizing said mask reciprocating actuating means.

7. In a pan greaser, the combination of: a pan greasing station; a pan supporting mask reciprocatively movable across said pan greasing station from a pan receiving station; actuating means for reciprocating said pan supporting mask; a continuously operating pan conveyor for conveying pans to said pan receiving station; rails in said receiving station receiving and supporting pans delivered thereto from said pan conveyor, said rails being movable between an extended position for supporting a pan and a retracted position to drop a pan onto said mask; actuating means for moving said rails between their extended and retracted positions; a gate traversing said pan conveyor and movable between retracted and extended positions; a trigger adapted to be engaged by a pan moved onto said rails by said pan conveyor; said trigger being operatively connected with said gate for moving said gate from its retracted position to its extended position to cause said gate to intercept a succeeding pan upon engagement of a preceding pan with said trigger; a pusher means for pushing along said rails a pan delivered onto said rails by said pan conveyor; actuating means for said pusher; means responsive to movement of said gate to its extended position for energizing said pusher actuating means; a locator positioned downstream from said trigger and engageable by a pan moved along said rails by said pusher means for orienting said pan above said mask; actuating means for simultaneously moving said trigger and locator between an extended and retracted position; means responsive to movement by the pusher means of a pan in engagement with said locator for energizing said rail actuating means to retract said rails whereby to drop said oriented pan onto said mask, and for simultaneously energizing said locator and trigger actuating means for retracting said locator and trigger; and means responsive to retraction of said locator and trigger for energizing said mask reciprocating actuating means.

References Cited in the file of this patent

UNITED STATES PATENTS

| | | |
|---|---|---|
| 1,657,663 | Devereux | Jan. 31, 1928 |
| 1,686,968 | Harber | Oct. 9, 1928 |
| 1,736,799 | Planert | Nov. 26, 1929 |
| 1,840,370 | Ryan et al. | Jan. 12, 1932 |
| 1,850,837 | Hatch | Mar. 22, 1932 |
| 1,858,642 | Ross | May 17, 1932 |
| 1,861,475 | Hopkins et al. | June 7, 1932 |
| 1,898,281 | Wunderlich | Feb. 21, 1933 |
| 2,350,708 | Roselund | June 6, 1944 |
| 2,424,252 | Orlando | July 22, 1947 |
| 2,499,621 | Archer | Mar. 7, 1950 |
| 2,631,059 | Karlstrom | Mar. 10, 1953 |
| 2,633,821 | Koerber | Apr. 7, 1953 |